US009508110B2

(12) United States Patent
Cheatham, III et al.

(10) Patent No.: US 9,508,110 B2
(45) Date of Patent: Nov. 29, 2016

(54) UNOBTRUSIVE AUDIO MESSAGES

(71) Applicant: Elwha LLC, Bellevue, WA (US)

(72) Inventors: Jesse R. Cheatham, III, Seattle, WA (US); William David Duncan, Mill Creek, WA (US); Roderick A. Hyde, Redmond, WA (US); Jordin T. Kare, Seattle, WA (US); Robert C. Petroski, Seattle, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 199 days.

(21) Appl. No.: 14/279,117

(22) Filed: May 15, 2014

(65) Prior Publication Data

US 2015/0332678 A1    Nov. 19, 2015

(51) Int. Cl.
*G06K 9/00* (2006.01)
*G06T 1/00* (2006.01)
*G09F 27/00* (2006.01)
*G10L 19/00* (2013.01)

(52) U.S. Cl.
CPC ............ *G06T 1/0021* (2013.01); *G09F 27/00* (2013.01)

(58) Field of Classification Search
CPC ........... H04N 5/00; G10L 19/00; G06K 9/00
USPC .................................. 382/100; 704/500, 503
See application file for complete search history.

(56) References Cited

U.S. PATENT DOCUMENTS

| | | | |
|---|---|---|---|
| 5,963,371 A | 10/1999 | Needham et al. | |
| 6,600,786 B1 | 7/2003 | Prakash et al. | |
| 6,654,067 B1 * | 11/2003 | Mc Gee | G06F 17/30802 348/700 |
| 7,215,792 B2 | 5/2007 | Sharma et al. | |
| 7,269,297 B2 | 9/2007 | Loce et al. | |
| 8,238,692 B2 | 8/2012 | Kim et al. | |
| 8,908,772 B2 * | 12/2014 | Gordon | 375/240.25 |
| 2004/0071310 A1 | 4/2004 | Sharma et al. | |
| 2004/0135927 A1 * | 7/2004 | Fischbeck | G09G 3/2029 348/671 |
| 2005/0111694 A1 | 5/2005 | Loce et al. | |
| 2005/0130652 A1 | 6/2005 | O'Toole et al. | |
| 2005/0169366 A1 | 8/2005 | Clark | |
| 2005/0173534 A1 | 8/2005 | Hepworth et al. | |
| 2006/0159303 A1 * | 7/2006 | Davis | G06F 17/30876 382/100 |
| 2006/0281060 A1 | 12/2006 | Katayama | |
| 2006/0290788 A1 | 12/2006 | Ohtsuka et al. | |
| 2008/0255931 A1 | 10/2008 | Kosho et al. | |
| 2010/0188488 A1 | 7/2010 | Birnbaum et al. | |
| 2012/0211555 A1 | 8/2012 | Rowe | |
| 2012/0323699 A1 | 12/2012 | Phillips | |
| 2013/0234930 A1 | 9/2013 | Palacios Goerger | |
| 2015/0014417 A1 | 1/2015 | Finlow-Bates et al. | |

* cited by examiner

*Primary Examiner* — Abolfazl Tabatabai

(57) ABSTRACT

A method for providing audio messages includes receiving a first image set and a second image set. The first image set includes visually encoded audio data for rendering audio on an electronic computing device. The method also includes displaying images from the first and second image sets interspersed in an image sequence. In the image sequence, a time interval between each image from the first image set and at least one image from the second image set is less than a critical flicker interval (CFI) for a human eye.

18 Claims, 13 Drawing Sheets

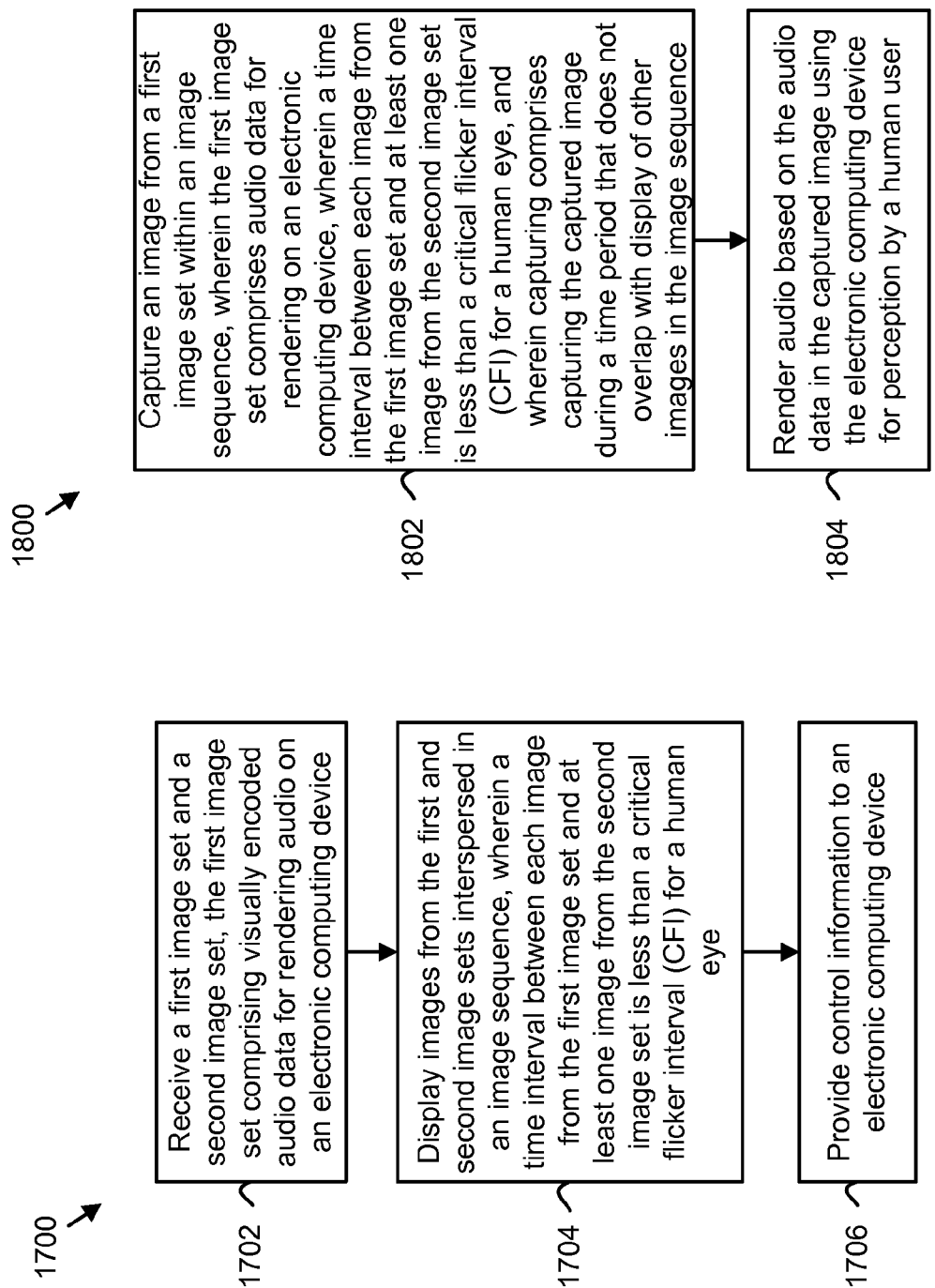

UNOBTRUSIVE AUDIO MESSAGES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BRIEF DESCRIPTION OF THE FIGURES

FIG. 17 is a schematic flow chart diagram illustrating a method for displaying an image sequence that includes an unobtrusive message.

FIG. 18 is a schematic flow chart diagram illustrating a method for capturing and providing a message from an image sequence that includes an unobtrusive message.

DETAILED DESCRIPTION

Figure 1:
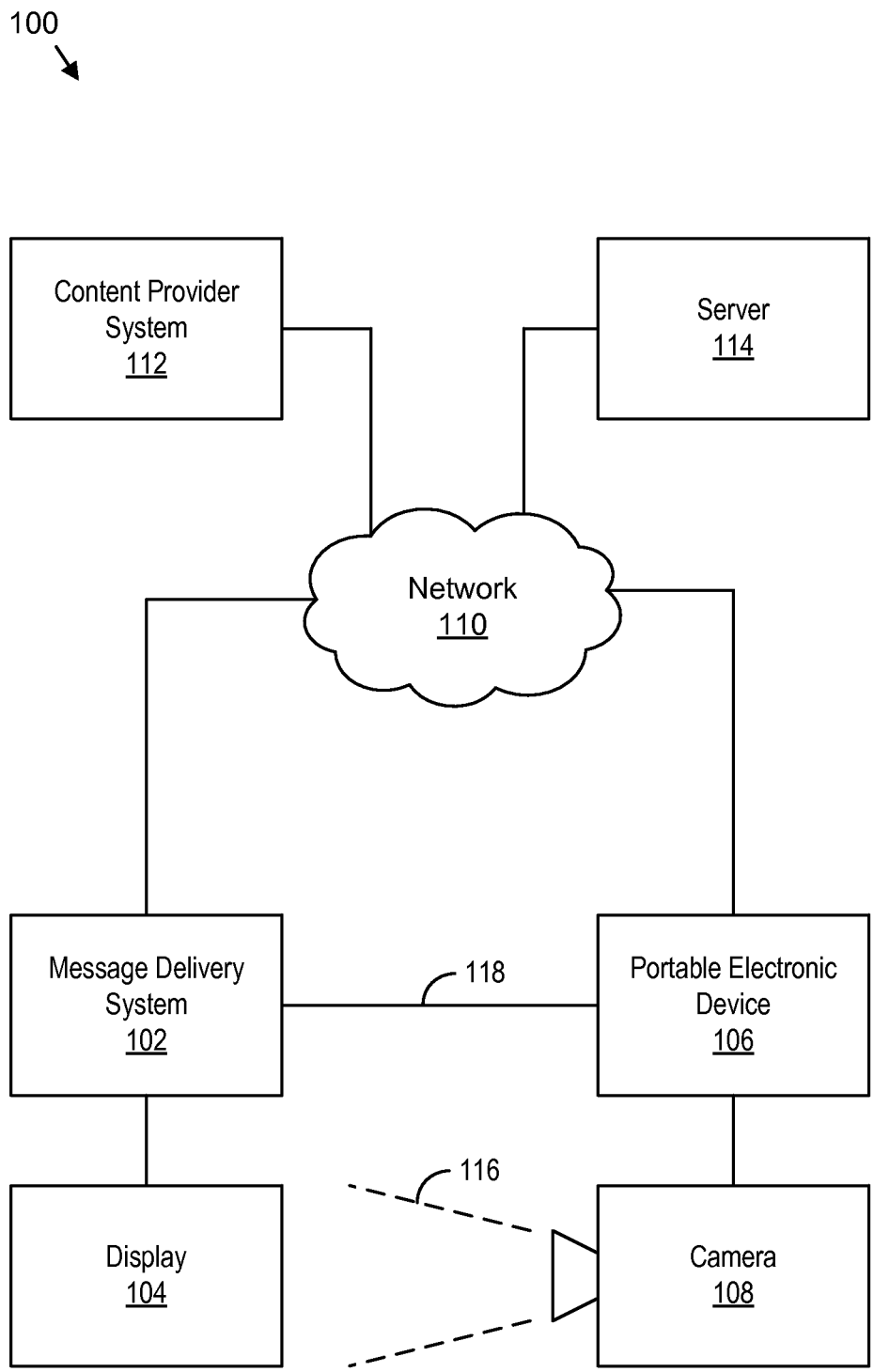
FIG. 1 is a schematic diagram of one embodiment of a system for delivering messages to a user of a portable electronic device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Large amounts of money are spent on advertising products and services for virtually every industry. Advertising allows companies, governments, or any other organization or individual to get a message to a large number of people and can thereby increase the number of customers as well as increase revenue. As such, organizations, as well as advertising companies or agencies, are always seeking for ways to increase advertising to increase income and/or increase brand awareness. Some examples of advertising include printed or digital public displays, and messages played on loud speakers in public locations.

Applicants have recognized a variety of problems with advertising, especially in public places or where large numbers of people may pass through. For example, large numbers of advertisements, posters, or display screens can become obtrusive and can actually annoy a potential audience of customers. Similarly, playing messages loud enough for people to hear may be bothersome. Furthermore, if advertisements become too excessive, individuals may no longer pay attention to them, or the likelihood that an individual will see or hear a specific advertisement may drop. Additionally, advertising costs can be prohibitive and, if not done effectively, can lead to an overall monetary loss. For example, only so many advertisements can be shown on a single printed or digital display or played on a speaker. Although electronic displays and loud speakers offer the ability to periodically change the displayed or played message, there is a limit to how often the advertisements may be changed, due to time limits at which individuals can see, hear, and/or comprehend a displayed or played advertisement.

The present application discloses systems, devices, and methods for providing audio advertisements or other messages that improve upon previous advertising devices, systems, and techniques. A method for providing audio messages includes receiving a first image set and a second image set. The first image set includes visually encoded audio data for rendering audio on an electronic computing device. The method also includes displaying images from the first and second image sets interspersed in an image sequence. In the image sequence, a time interval between each image from the first image set and at least one image from the second image set is less than a critical flicker interval (CFI) for a human eye.

Turning to the figures, FIG. 1 is a schematic diagram illustrating one embodiment of a system 100 for providing machine readable messages. In one embodiment, the system 100 may provide the messages in an unobtrusive manner such that they are not apparent to the human eye. Example messages that may be delivered include advertisements, a message to a particular individual or group of individuals, warning messages, and/or public service announcements. The system 100 includes a message delivery system 102, a display 104, a portable electronic device 106, a camera 108, a network 110, a content provider system 112, and a server 114. In one embodiment, the system 100 delivers messages from the message delivery system 102 to the portable electronic device 106 via the display 104 and camera 108. For example, when the display 104 is within a field of view 116 of the camera 108, the portable electronic device 106 may be able to receive the message and/or present the message to a user of the portable electronic device 106. The lines interconnecting the various components 102-114 are given by way of illustration and may indicate wired and/or wireless communication links between components.

The message delivery system 102 may include a computing system or device that displays an image sequence on the display 104. The image sequence may display an image corresponding to a message to be sent in between a preceding image and a subsequent image at a rate such that the image corresponding to the message is not perceivable to the human eye. For example, a duration for the display of the image corresponding to the message may be equal to or less than a critical flicker interval (CFI) for a human eye. Similarly, a duration between the preceding image and the subsequent image, during which the image corresponding to the message is displayed, may be equal to or less than the CFI.

As used herein, the term CFI is given to mean a time length at which flashes of an image or light separated with time intervals longer than the CFI are distinguishable, and flashes of an image or light separated with time intervals about the same as or shorter than the CFI are not distinguishable to the human eye. The CFI may be the inverse of the critical flicker fusion frequency (CFF) or 1/CFF. A related principle is the integration time of the human eye, or the time during which the eye accumulates light energy before sending an image to the brain or before the brain perceives a single image. For example, if a plurality of images are sent during the integration time, the eye may "sum" the images into a single image. "Temporal Resolution" by Michael Kallaniatis and Charles Luu (accessed at http://webvision.med.utah.edu/book/part-viii-gabac-receptors/temporal-resolution/ on Apr. 18, 2014) discusses temporal resolution, critical flicker frequency, and integration times for the human eye. Example ranges for the CFI include from about 10 milliseconds (ms) to about 70 ms.

In one embodiment, the message delivery system 102 may receive content and/or be controlled by the content provider system 112 and/or server 114 via the network 110. For example, the content provider system 112 and/or server 114 may control a plurality of message delivery systems 102 and/or displays 104. In one embodiment, the content provider system 112 may provide a plurality of images or message data to be communicated by the message delivery system 102.

The display 104 may include a display located in a public location or location where it will be visible to a plurality of people and/or their portable electronic devices 106. For example, the display 104 may be located within a building open to the public or near a walkway, roadway, train station, airport, bus station, or other location. Example displays may include electronic signs or billboards. In one embodiment, a plurality of displays 104 may be included, and are controlled by one or more message delivery systems 102. For example, a network of displays 104 within a city, building, or other location may be controlled together or independently to display messages.

The portable electronic device 106 may control the camera 108 to capture the image corresponding to the message. The portable electronic device 106 may then render the captured image, or data encoded in the captured image, for a user. In one embodiment, all information or instructions needed to properly render the image or encoded data to a human user are communicated to the portable electronic device 106 via the display 104 and/or the camera 108. For example, instructions for decoding information, detecting the messages, and/or other information may be visually encoded within images displayed by the display 104. In one embodiment, some information may be provided to the portable electronic device 106 via a direct communication link 118 with the message delivery system 102 or a connection with the network 110. In one embodiment, the portable electronic device 106 may obtain instructions for capturing images displayed on the display 104, instructions for decoding data encoded within images displayed by the display 104, instructions for presenting a message to a user of the portable electronic device 106, or any other instructions or information.

The system 100 of FIG. 1 is given by way of example only, and some embodiments may not include all of the illustrated components 102-114 or may include different components. For example, in one embodiment, a system may omit the network 110, content provider system 112, and/or server 114.

Figure 2:
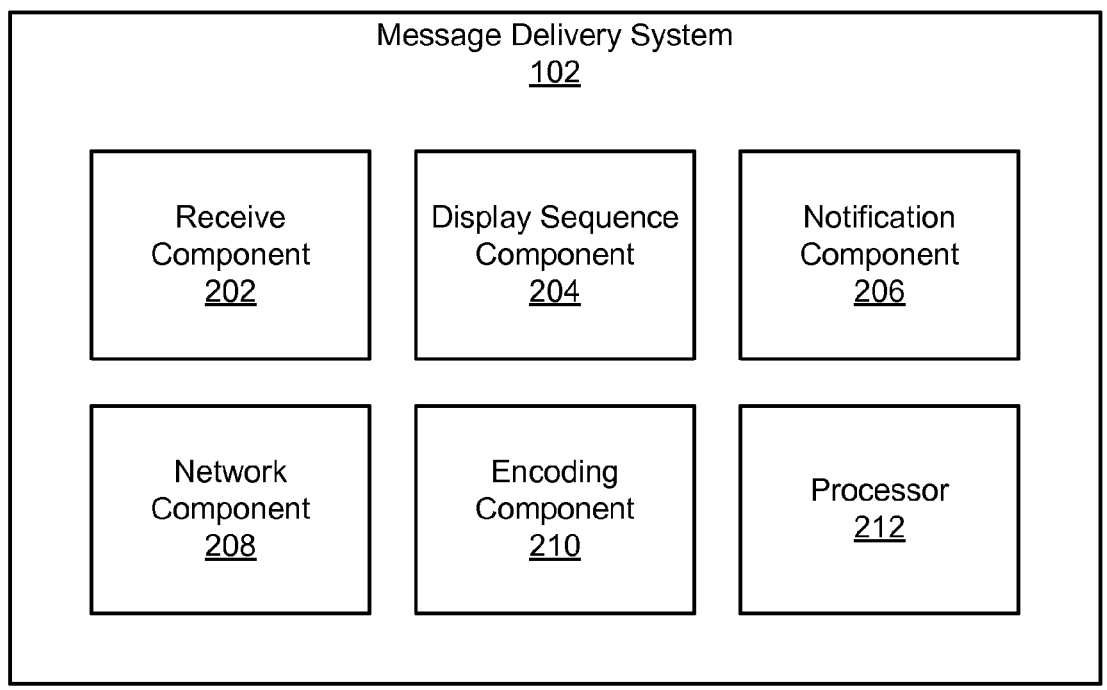
FIG. 2 is a schematic block diagram of one embodiment of a message delivery system.

FIG. 2 is a schematic block diagram illustrating components of an embodiment of a message delivery system 102. The message delivery system 102 includes a receive component 202, a display sequence component 204, a notification component 206, a network component 208, an encoding component 210, and a processor 212. The components 202-212 are given by way of example only and may not all be included in all embodiments. Additionally, the components 202-212 may be distributed or combined with any of the other components 102-114 illustrated in FIG. 1 and are not necessarily all included within the same apparatus or device.

The receive component 202 is configured to receive one or more images, image sets, or other data corresponding to a message for presentation to a human. In one embodiment, the receive component 202 receives the images from a remote device such as the content provider system 112, the server 114, or another device via a network 110. For example, the images or messages to be displayed may be provided by the content provider system 112 to allow for remote control of the message delivery system 102 and/or the display 104. In another embodiment, the receive component 202 may receive the images from memory, such as memory remote or local to the message delivery system 102.

In one embodiment, the receive component 202 is configured to receive a first image set and a second image set. The first image set may include data corresponding to a message to be delivered to a human. For example, the first image set may include an image or audio data corresponding to one or more of an advertisement message, a message to a particular individual or group of individuals, a warning message, and a public service announcement. An advertisement message may include an image which may be captured and displayed to a user as an advertisement for a product or service. A message for a particular individual or group may include a message such as an event message, a paging message, or the like. A warning message may include information about upcoming weather, construction, news, or other information. A public service announcement may include information about local emergencies, crime watches, or messages from government organizations. The message may include images, text, audio, or other information for presentation or rendering for a user.

In one embodiment, the first image set includes an image for display to a human. For example, at least a portion of the image may be human readable. In another embodiment, an image from the first image set may include machine readable information such as a barcode. For example, the barcode may encode audio data corresponding to audio to be rendered as part of a message. In another embodiment, an image from the first image set may encode information (e.g., digital or audio information) encoded by the color and/or intensity of individual pixels or sequences of pixels within the image. In one embodiment, the image may include both a human readable image and machine readable information. For example, a portion of the image may include human readable information such as a picture or text, and another portion of the image may include a barcode that encodes corresponding data, such as audio data. As another example, the image may include a human readable image with a machine readable watermark within the image. The first image set may include more than one image corresponding to the same message. For example, a message may include video and two or more images, and the first image set may include images for different frames of the video. As another example, a message may include an audio track and the one or more images may encode audio data for the audio track.

The second image set may include images for display before and/or after images from the first image set. In one embodiment, the second image set may include images for creating a composite image when displayed with the one or more images from the first image set. For example, the second image set may include images which are visible for a user. In another embodiment, the second image set may include images for one or more additional messages. For example, images in the first image set may correspond to a first message, and images in the second image set may correspond to a second or third or more messages. For example, the second message may include images that include human readable images, audio data, or any other information for a plurality of messages for potential presentation to a user.

In one embodiment, one or more of the images received by the receive component 202 may include encoded tags, instructions, or other data. For example, tags may be used to indicate that an image corresponds to a message or indicate that advertising or other messages are present. In one embodiment, different images may be tagged as corresponding to different messages. Similarly, the images may include instructions for capturing, decoding, and/or presenting messages, images, or message data to a user.

The display sequence component 204 is configured to display an image sequence including one or more of the images received by the receive component 202. In one embodiment, the display sequence component 204 provides an image or video feed to the display 104 that includes the image sequence. In one embodiment, the display sequence component 204 may include or be in communication with a video card or other display device.

In one embodiment, the display sequence component 204 displays an image sequence that includes images from the first and second image sets interspersed in an image sequence. For example, each image from the first image set may be interspersed between a previous image selected from the second image set and a subsequent image selected from the second image set. Additionally, a duration between the previous image and the image from the first image set, or a duration between the image from the first image set and the subsequent image may be less than a CFI for a human eye, or the duration of each image from the first image set may be less than the CFI. Thus, the images from the second image set may, in combination with a short display duration, effectively "hide" the image from the first image set. For example, if the image from the first image set is an advertisement, the advertisement may be hidden from view of the unaided human eye. Thus, advertisements may be displayed without bothering those who do not wish to see them. For example, a portable computing device may be used to capture and provide the advertisement to a user if that is in accordance with the user's settings.

In one embodiment, the display sequence component 204 displays an image sequence that presents a human-perceivable composite image. For example, the image sequence with the image order, image durations, and included images may appear as a composite image to an unaided human eye. In one embodiment, an image from the first image set (or other image for advertising or messaging) may be indistinguishable from other images in the image set to an unaided human eye. The composite image may be displayed on a sign, a billboard, or any other electronic display.

The images, durations, and the like may be selected to present a desired composite image. For example, the images may be selected to provide an unobtrusive or pleasing appearance. In one embodiment, the composite image may appear to be art such as an image or picture of a landscape, a painting, or any other pleasing image. For example, the composite image may be a neutral, unstructured scene or a selected background image with a low temporal signature in that it appears to change infrequently. In one embodiment, the composite image may blend in with a surrounding. For example, the composite image may have a pattern matching a wall material such as brick, siding, or any other material. In one embodiment, the selection of images in the second image set may be defined based on the desired composite image and the desired "message" to be conveyed by the first image set, for instance so that images within the second image set act as the visual difference between the composite image and the images of the first image set. In an embodiment, the visual difference comprises a color difference, so that the addition of the colors of a pixel in an image of the first data set to the color of a corresponding pixel and image of the second image set appears to the human eye as the desired color of the pixel for the composite image. In another embodiment, the visual difference comprises an intensity difference. In another embodiment, the visual difference comprises both color and intensity differences for individual pixels. In some embodiments, specification of the pixels and images of the first image set can constrain selection of the composite pixels and images, so as to avoid unrealizable colors or intensities for the pixels of the second image set. In one embodiment, the composite image may present a static image that appears to remain constant for a period of time. For example, the composite image may appear to be a still image or series of still images. In another embodiment, the composite image may present a changing image. In one embodiment, the changing image may appear to be static or noise or other unintelligible mishmash. For example, the plurality of images and their fast switching may cause the display to be unintelligible to the human eye or be perceived as "noise", and may be of little or no interest without the aid of a machine. In one embodiment, the changing image may appear to be a video feed. A user may be able to watch the video feed with little or no perception that advertising or other messages are embedded within the feed.

In one embodiment, the image sequence includes at least one image corresponding to a message, as discussed above. For example, the image may include an image for presentation to a user and that is human readable if displayed for a sufficient length of time. The image may include pictures, patterns, text, or any other visual information that can be perceived and comprehended by a human. In one embodiment, a plurality of images corresponding to a video may be included, which may be captured and later presented to a user for viewing as a video. In one embodiment, the image sequence includes images with encoded data corresponding to the message. For example, the encoded data may include audio data which may be decoded from an image and rendered by a user's device, such as the portable electronic device 106.

In one embodiment, audio encoded within one or more images may correspond to an audio track for an audio only message or an audio track corresponding to an image or video. In one embodiment, encoded audio data may correspond to a composite image presented to a human eye by the displayed image sequence. For example, the image sequence may include a video, and the audio data may correspond to an audio track for the video. In one embodiment, encoded audio may allow for a user's device to capture, decode, and render the audio data so that a user may hear the audio track while maintaining a quiet environment. For example, a user with headphones may be able to hear sound corresponding to a video displayed on a display while other humans nearby are not distracted by the sound.

The encoded audio data may be encoded in a variety of formats. In one embodiment, the encoded audio data may be encoded as a machine readable barcode. For example, an image in the first image set may include a machine readable barcode. In one embodiment, an image may include encoded audio data as well as a human readable image (e.g., an image that could be understood by a human if displayed for a long enough time duration). For example, a portion of the image may include the machine readable barcode while another portion of the image may include the human readable image. As another example, substantially the whole image may include a human readable image with a machine readable watermark encoded within the human readable image.

In one embodiment, the display sequence component 204 may display an image sequence that includes images corresponding to more than one message. For example, one image may correspond to a first message for potential delivery to a human user while another image may correspond to a second message for delivery to the human user. In one embodiment, images within a first image set correspond to a first message, and images within a second image set correspond to a second message. In a related embodiment, images from the second image set can be used to effectively "hide" the first message, while images from the first image set can be used to effectively "hide" the second message. In one implementation of this embodiment, the time interval between each image from the first image set and at least one image from the second image set is less than the CFI, while the time interval between each image from the second image set and at least one image from the first image set is also less than the CFI. In one embodiment, images within the first image set correspond to a plurality of different messages while images within the second image set correspond to images used to hide or obscure the images within the first image set. The images in the image sequence may be displayed without overlapping each other. For example, each image may be displayed for a specified time display interval that does not overlap with the specified time display interval for any other image. In one embodiment, a time interval between an end of an image and a start of the specified time display interval for a following image is less than the CFI. In one embodiment, a time interval between a start of the specified time display interval for an image and an end of the specified time display interval for a preceding image is less than the CFI Multiple messages within the image sequence may include different still images, videos, and/or audio tracks. For example, a first message may include an image for display as a still image as part of a message, a second message may include one or more images encoding audio data for an audio-only message, and/or a third message may include a plurality of images corresponding to frames of a video of a video message. Similarly, multiple audio tracks, still images, videos, or the like may be included or encoded within images corresponding to different messages within the same image sequence.

In one embodiment, the display sequence component 204 may display an image sequence as received by the receive component 202. For example, the receive component 202 may receive one or more images within an already defined image sequence. The image sequence may be stored within memory (local or remote) and/or communicated to the message delivery system 102 by a remote device or system, such as a server 114 or a content provider system 112. Thus, the display sequence component 204 may only be required to play the image sequence on a display 104.

In another embodiment, the display sequence component 204 may generate the image sequence to be displayed. For example, the receive component 202 may receive a plurality of images, audio data, or other message data, and the display sequence component 204 may combine the data into the image sequence. In one embodiment, the display sequence component 204 may create an image sequence in which message data is obscured or hidden. For example, the display sequence component 204 may generate a sequence where images corresponding to the same message are not positioned sequentially in time. As another example, the display sequence component 204 may generate a sequence where images corresponding to a message to be hidden or obscured are displayed for a duration less than the CFI for the human eye.

In one embodiment, the display sequence component 204 may generate an image sequence that includes images corresponding to one or more messages and that provides a desired composite image. For example, if the desired image is a predefined static image, the image sequence may intersperse the images corresponding to messages (e.g., images from a first image sequence) between images similar to the predefined static image. In one embodiment, the display sequence component 204 may modify a predefined static image to compensate for effects of the interspersed message images to generate a human perceivable composite image that looks like the predefined image. For example, the display sequence component 204 may modify intensity for colors or brightness of one or more pixels within the predefined static image to compensate for pixels within the message images.

Figure 4:
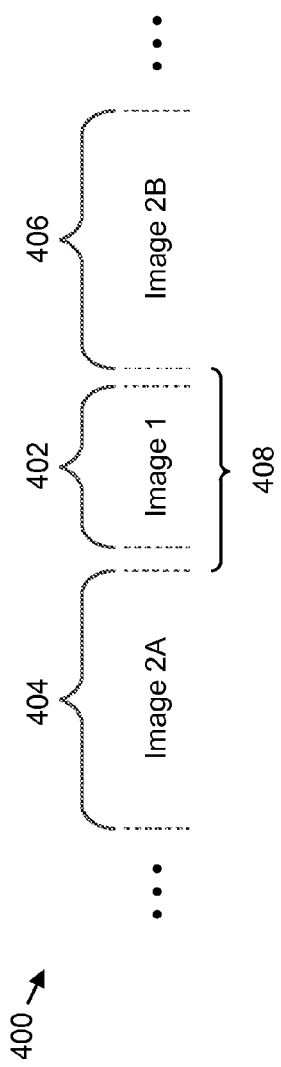
FIG. 4 is a schematic diagram of one embodiment of an image sequence displayed by a message delivery system.
Figure 5:
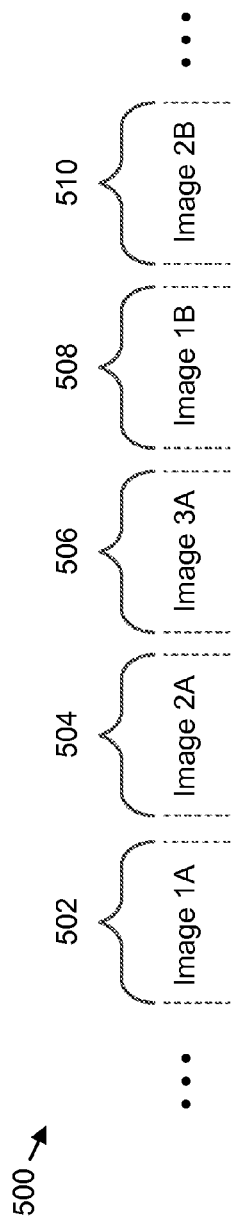
FIG. 5 is a schematic diagram of another embodiment of an image sequence displayed by a message delivery system.
Figure 6:
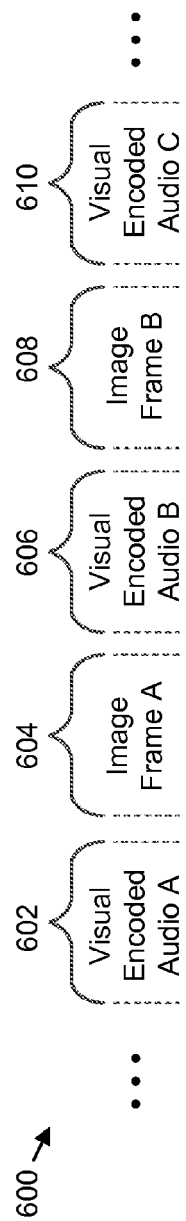
FIG. 6 is a schematic diagram of yet another embodiment of an image sequence displayed by a message delivery system.

FIGS. 4, 5, and 6 are schematic diagrams illustrating portions of example image sequences which may be displayed and/or generated by the display sequence component 204. FIG. 4 illustrates an image sequence 400 that includes image 1, image 2A, and image 2B within a time slot 402, a preceding timeslot 404, and a subsequent time slot 406, respectively. In one embodiment, image 1 is an image received as part of a first image set, and image 2A and image 2B are images received as part of a second image set. In one embodiment, image 1 is an image to be hidden or obscured. For example, image 1 may be an image that corresponds to a message such as an advertisement. Image 2A and image 2B may include images which can be used to hide or obscure image 1. Image 2A and image 2B may include features to give the image sequence an appearance of a composite image to a human eye or may be images corresponding to other messages. Image 1 is displayed during the time slot 402, image 2A is displayed during an immediately preceding time slot 404, and image 2B is displayed during an immediately subsequent time slot 406. The time slot 402 may have a duration about equal to or less than the CFI of the human eye. In one embodiment, a duration between the ending of the preceding time slot 404 and the beginning of time slot 402 may be about equal to or less than the CFI of the human eye. In one embodiment, a duration between the ending of time slot 402 and the beginning of the subsequent time slot 406 may be about equal to or less than the CFI of the human eye. In one embodiment, a duration 408 between the ending of the preceding time slot 404 and the beginning of the subsequent time slot 406 may be about equal to or less than the CFI of the human eye. In the depicted embodiment, durations for the preceding time slot 404 and subsequent time slot 406 are greater than the duration for the time slot 402, as these may include data that is not meant to be hidden or obscured. In one embodiment, the image sequence 400 may repeat for a message time period or may be followed by a different time sequence encoding a different message. In an unshown embodiment, the image sequence may comprise two or more images from image set 1 (e.g., images 1A, 1B, and 1C) interspersed between images 2A and 2B. Nonetheless, the durations between 2A and each of the images of set 1, or that between the images of set 1 and image 2B can be made less than the CFI, and hence images 2A and 2B will serve to "hide" each of the images in set 1 (e.g., 1A, 1B, and 1C) from a human viewer.

FIG. 5 illustrates an image sequence 500 that includes image 1A, image 2A, image 3A, image 1B, and image 2B within time slots 502, 504, 506, 508, and 510, respectively. In one embodiment, image 1A and image 1B correspond to a first message, image 2A and image 2B correspond to a second message, and image 3A corresponds to a third message. In the image sequence 500, images corresponding to different messages act to obscure or hide images corresponding to other messages. In one embodiment, a portable electronic device 106 may select which message to provide to a user and capture, display, or render information from images corresponding to that message. In one embodiment, image 1A may correspond to a first video frame for the first message while image 1B may correspond to a second video frame for the first message. In one embodiment, image 1A may correspond to an image to be displayed for a first message, and image 1B may include encoded audio data to be rendered with display of the first message. Once again, the duration of one or more of the time slots 502, 504, 506, 508, 510 may be less than the CFI. Other permutations and modifications are also contemplated within the scope of the present disclosure.

FIG. 6 illustrates an image sequence 600 that includes visual encoded audio A, image frame A, visual encoded audio B, image frame B, and visual encoded audio C within time slots 602, 604, 606, 608, and 610 respectively. According to one embodiment, visual encoded audio A and image frame A correspond to a first audio/video message, visual encoded audio B and image frame B correspond to a second audio/video message, and visual encoded audio C corresponds to a third audio-only message. In one embodiment, although not shown, additional images for each of the first, second, and third messages may be included within preceding or subsequent frames of the image sequence 600. In the image sequence 600, image frames are located between encoded audio, in time. Thus, although an image may be located next to an image corresponding to the same message, the image may still be obscured, as one image may include encoded data which will have a similar obscuring or hiding effect as images from different messages.

Returning to FIG. 2, the notification component 206 is configured to provide notifications, instructions, or other control information to portable electronic devices 106 regarding a displayed image sequence or messages within an image sequence. The control information may allow a portable electronic device 106 or other device to capture images or other information corresponding to a message and present the images or information in accordance with the control information. In one embodiment, the control information may be provided to the portable electronic devices 106 by a content provider system 112 or a server 114 over a network 110.

In one embodiment, the notification component 206 provides the control information using a network component 208. The network component 208 may include a communication device such as an antenna or a network interface card (NIC) that is capable of communicating with a portable electronic device 106 directly or via a network 110. For example, the network component 208 (or another device) may be configured to provide data to the portable electronic device 106 using a website, a wireless communication interface, a push message, a pull message, or the like. For example, a pull message may be sent to the portable electronic device 106 in response to the portable electronic device 106 checking to see if the display 104 is providing unobtrusive messages. Similarly, the portable electronic device 106 may access a website in order to check for information corresponding to the display 104. Push messages may be used in one embodiment so that the portable electronic device 106 is not required to be actively looking for messages in all electronic displays.

In one embodiment, the network component 208 can provide signals to a nearby portable electronic device 106 using an antenna. For example, the network component 208 may establish a session with the portable electronic device 106 or broadcast information that may be received by the portable electronic device 106. In one embodiment, the network component 208 may communicate with the portable electronic device 106 via a network 110, such as the internet. In one embodiment, both the network component 208 and the portable electronic device 106 may establish a communication session with the server 114 and may be able to exchange data via the server. The network component 208 may communicate information according to internet protocol (IP) or any other known communication standard.

In one embodiment, the notification component 206 provides the control information using the encoding component 210. The encoding component 210 may encode the control information visually within one or more images within an image sequence. For example, the encoding component 210 may encode data or instructions in a visual barcode such as a quick response (QR) code or other linear or two-dimensional barcode. In one embodiment, the encoding component 210 is configured to encode data as a watermark within an image. For example, a watermark may include changes to pixels from their original value such that the changes do not significantly affect the appearance of an image to a human. In one embodiment, an original or non-watermarked image may be included in an image sequence to allow a decoding device to compare and locate the changed pixels corresponding to the watermark.

In one embodiment, some information may be communicated using the network component 208 while other information is communicated via encoding the data in an image within the image sequence using the encoding component 210. In one embodiment, all control information or other information may be communicated to a portable electronic device 106 through images and/or encoded data within images. Communicating exclusively via images displayed on a display screen may allow for portable electronic devices 106 with no data connection or capability to still capture and provide images to a user. On the other hand, data connections may be ubiquitous and less processor intensive.

In one embodiment, the notification component 206 provides an indication or information indicating that messages are included within an image sequence. For example, an indication may be provided to a portable electronic device 106 so that the portable electronic device 106 knows to look for messages. In one embodiment, the notification component 206 provides a tag on an image which is easily recognizable by a machine and which can be used to trigger the portable electronic device 106 to begin looking for or capturing unobtrusive messages. In one embodiment, the notification component 206 broadcasts a signal indicating that it is displaying unobtrusive messages. In one embodiment, the notification component 206 may also provide a notification that certain images correspond to a message, the same messages, or different messages. For example, images may be tagged as corresponding to different messages or different audio tracks for different messages.

In one embodiment, the notification component 206 provides capture instructions to a portable electronic device 106. The capture instructions may include information for the portable electronic device 106 on how to capture an image that corresponds to a message. For example, the capture instructions may include instructions that indicate one or more of a timing, an image sequence number, and a frame number for an image available for capture. The capture instructions may include a timing for the portable electronic device 106 so that the portable electronic device 106 can time a capture procedure (such as taking a picture or capturing an image) to obtain a desired image. For example, the timing information may indicate that images which will be displayed in 1 ms and 5 ms relate to a first message while images which will be displayed in 2 ms and 7 ms relate to a second message. Timing information may indicate the start and stop times for the display of individual images, may indicate the intervals between images, may indicate the intervals between the end of displaying one image and the start of displaying the next image, etc. In one embodiment, a timing for a later image may be encoded visually within a previous image. In one embodiment, sequence or frame numbers may be provided for each image. Additionally, each image and its associated sequence or frame number may be associated with a specific message. For example, images 1, 4, 7, and 10 may belong to a first message, images 2, 5, 8, and 11 may belong to a second message, and images 3, 6, 9, and 12 may belong to a third message. Sequence spacing may vary both in order and/or in temporal intervals. For examples, different images may have different display durations.

In one embodiment, the capture instructions may indicate an exposure length, a shutter speed, or the like to use in order to capture an image during a time during which only the desired image, and no other image, is being displayed on the display 104. As discussed above, the capture instructions may be communicated via data encoded within images of a displayed image sequence or via a network connection with one or more of a website, a display 104, or the message delivery system 102. In one embodiment, the capture instructions encoded within the image sequence may be encoded in advance of an image to be captured so that a portable electronic device 106 has the ability to decode and/or process the information with enough time to capture the image.

In one embodiment, the notification component 206 provides an indication of subject matter corresponding to one or more messages being communicated by the message delivery system 102. For example, the notification component 206 may indicate whether a message (and the associated images within the image sequence) is related to advertising, a warning, a public service announcement, or a message for a specific individual or group of individuals. In one embodiment, the indication of subject matter may indicate a topic for an advertisement, a warning, or any other message. For example, the indication of subject matter may indicate whether an advertisement relates to automobiles, groceries, restaurants, sporting goods, electronics, events, or any other topic. Similarly, the indication of subject matter may indicate whether the advertisement is directed towards a specific age group, gender, profession, language, or other demographic. The subject matter data may indicate whether a message contains only images, only audio, only video, only text, or a combination of audio, images, video, and text.

In one embodiment, the notification component 206 provides decoding instructions. The decoding instructions may indicate to a portable electronic device 106 how to decode information encoded within images. For example, the decoding instructions may indicate a format or display mode for encoded audio, capture instructions, subject matter data, synchronization instructions, or any other information. A portable electronic device 106 may then be able to decode the information and/or provide a message to a user based on the decoding instructions.

In one embodiment, the notification component 206 provides synchronization instructions to instruct a portable electronic device 106 how to render capture information for a human user. For example, if a message includes audio data and visual data, the synchronization instructions may indicate a timing for the audio data in relation to the visual data, or vice versa. In one example, the synchronization instructions may indicate a timing in relation to a real-time display on the display 104 (such as a display of a human perceivable composite image). As another example, the synchronization instructions may indicate that audio data is to be rendered at the same time a specific image is displayed.

Figure 7:
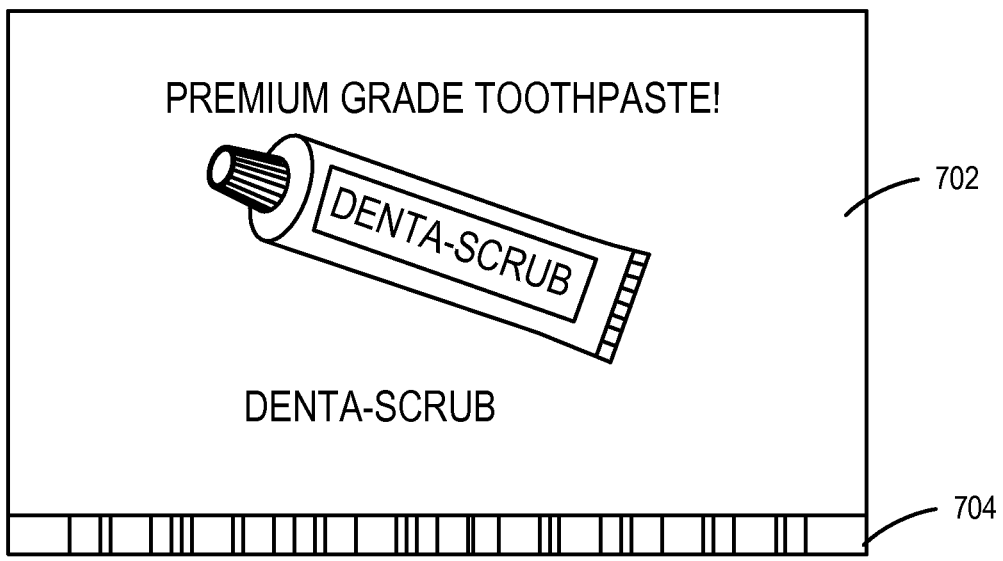
FIG. 7 illustrates one embodiment of an image that includes a human readable portion and a machine readable portion.
Figure 8:
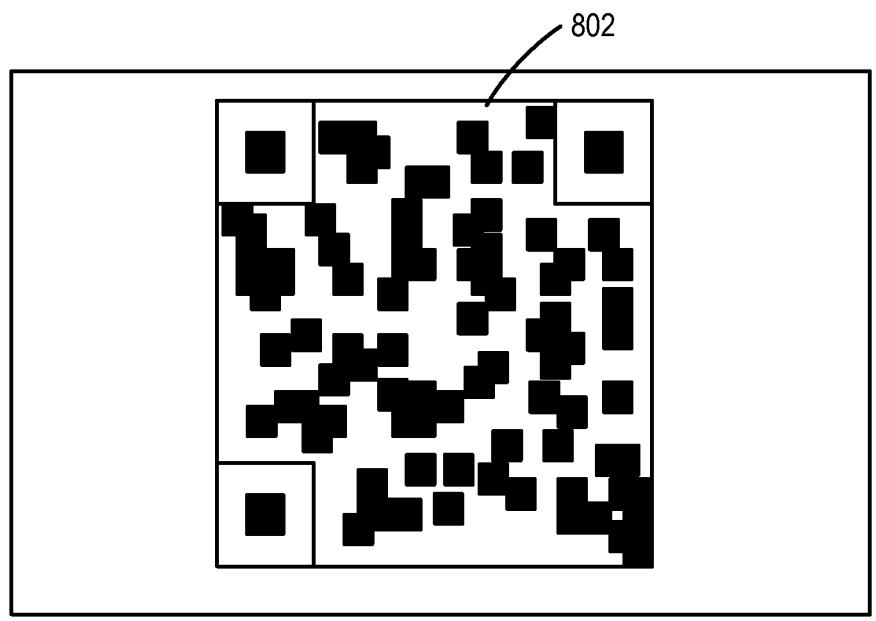
FIG. 8 illustrates one embodiment of an image that includes a machine readable portion.

FIGS. 7 and 8 illustrate embodiments of images which include visually encoded data in a machine readable format. FIG. 7 illustrates an image that includes both a human readable portion 702 and a machine readable portion 704. The human readable portion 702 may include a portion of a message, such as an advertisement. The human readable portion 702 may be meant for capture by a portable electronic device 106 and presentation to a user. The machine readable portion 704 includes a barcode that includes encoded information. For example, the barcode may include encoded audio data for a message, subject matter data for a message, capture instructions, synchronization instructions, decoding instructions, a sequence or frame number, and/or any other encoded data. FIG. 8 illustrates an image that includes a two-dimensional machine readable barcode 802. The machine readable barcode 802 may include any information discussed herein.

Returning to FIG. 2, the message delivery system 102 may include a processor 212. For example, the components 202-210 may include a computer readable medium and/or instructions executable by the processor 212. In one embodiment, the components 202-210 may include circuitry in communication with and/or under control of the processor 212.

Figure 3:
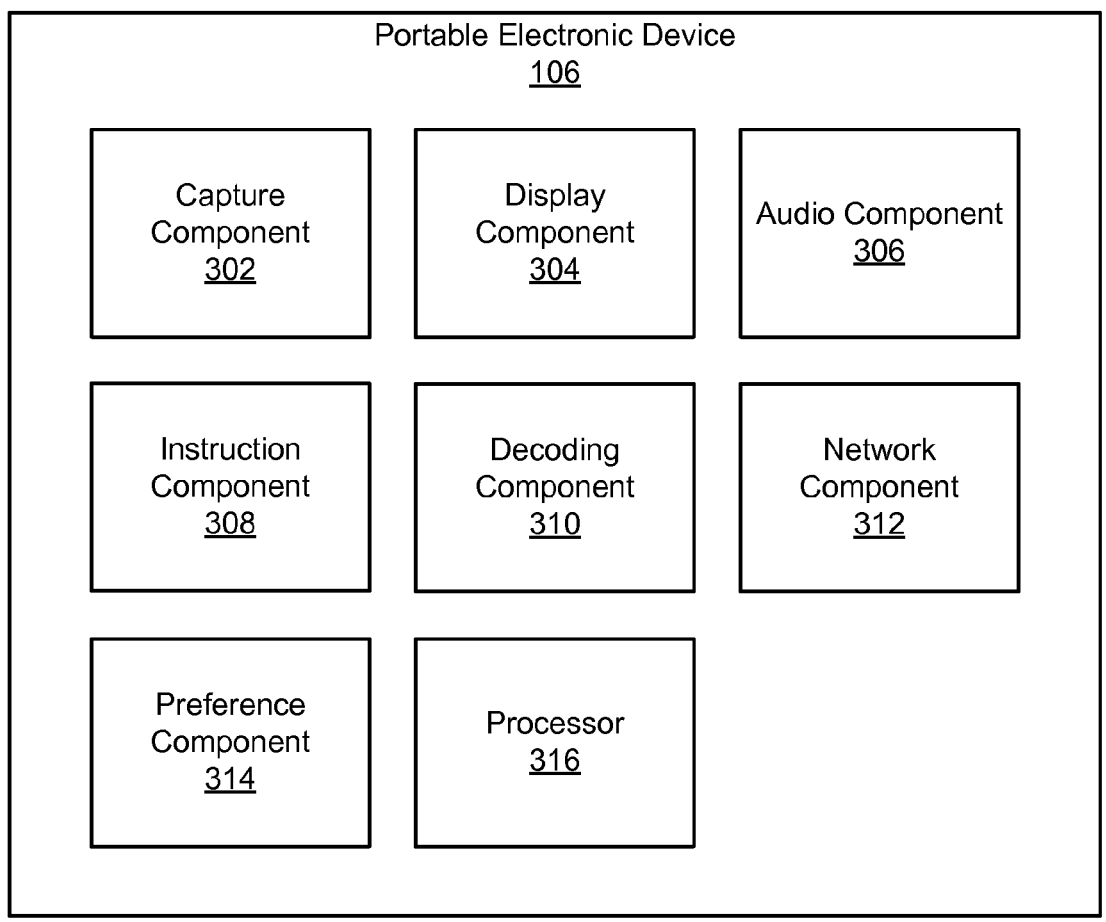
FIG. 3 is a schematic block diagram of one embodiment of a portable electronic device.

Turning to FIG. 3, a schematic block diagram for one embodiment of a portable electronic device 106 is shown. The portable electronic device 106 includes a capture component 302, a display component 304, an audio component 306, an instruction component 308, a decoding component 310, a network component 312, a preference component 314, and a processor 316. The components 302-316 are given by way of example only and may not all be included in all embodiments. Additionally, the components 302-316 may be distributed throughout a plurality of devices or within a single device. In one embodiment, the portable electronic device 106 may include one or more of a smartphone, a heads-up display, a wearable computing device, or the like.

The capture component 302 is configured to capture an image corresponding to a message from an image sequence displayed on a display 104. In one embodiment, the capture component 302 is configured to capture an image from a first image set displayed within the image sequence. For example, the capture component may capture an image corresponding to the messages or message types discussed within the present disclosure. Similarly, any image type as discussed herein may be captured. For example, the image may include human readable visual data such as text, pictures, video frames, or the like and/or may include machine readable information such as audio data, control information, or other data encoded in a visual format. In one embodiment, the capture component 302 may capture the image from an image sequence that includes an image from a first image set and one or more images from a second image set. The capture component 302 may control or include a camera to capture the image. The camera may include a vehicle-mounted camera, a user-worn camera, and a camera integrated into the portable electronic device 106 and/or in communication with the portable electronic device 106.

In one embodiment, the capture component 302 may repeatedly capture images of a display 104 at a capture interval and thereby capture each image displayed by the display 104. For example, if the capture interval is about one-half of the shortest display duration of an image in the image sequence, the capture component 302 will have captured each image in the image sequence at least once. For example, if the shortest display duration is about equal to the CFI, a capture interval of one-half of the CFI may allow for all images to be captured. Images that do not correspond to messages to be displayed to a user may be discarded or deleted. Similarly, if the capture component 302 is synchronized with the display 104 and captures images of the display 104 at a capture interval approximately equal to the shortest display duration of an image in the image sequence, the capture component 302 may likewise be able to capture each displayed image at least once.

In one embodiment, the capture component 302 selectively captures images corresponding to messages in which a user may be interested. For example, the capture component 302 may only capture images during times when a desired image is being displayed. In one embodiment, the capture component 302 first gathers capture instructions from a display 104 and then captures a desired image. As discussed above, the capture instructions may indicate a timing, sequence number, frame number, or other information which indicates to the capture component 302 when to capture a specific image. As previously discussed herein, some image sequences may include images that correspond to a plurality of different messages. In one embodiment, the capture component 302 may be configured to capture only images corresponding to messages that align with preferences of the user and/or settings of the portable electronic device 106. Further discussion of which images correspond to a user's preferences and a determination of which messages to present to a user will occur in relation to the preference component 314.

Figure 9:
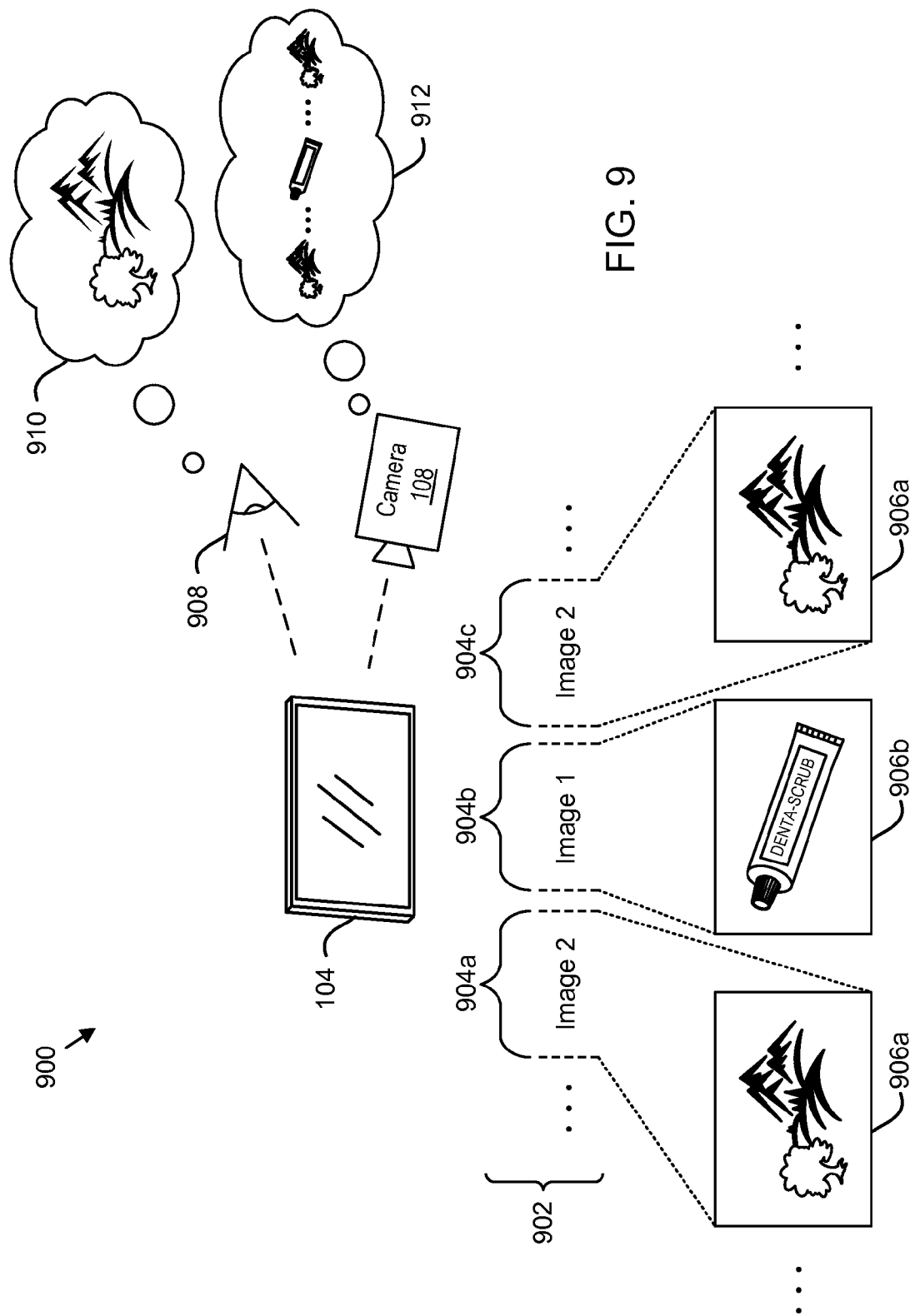
FIG. 9 is a schematic diagram illustrating one embodiment of perception of an image sequence by a human eye and a camera.
Figure 10:
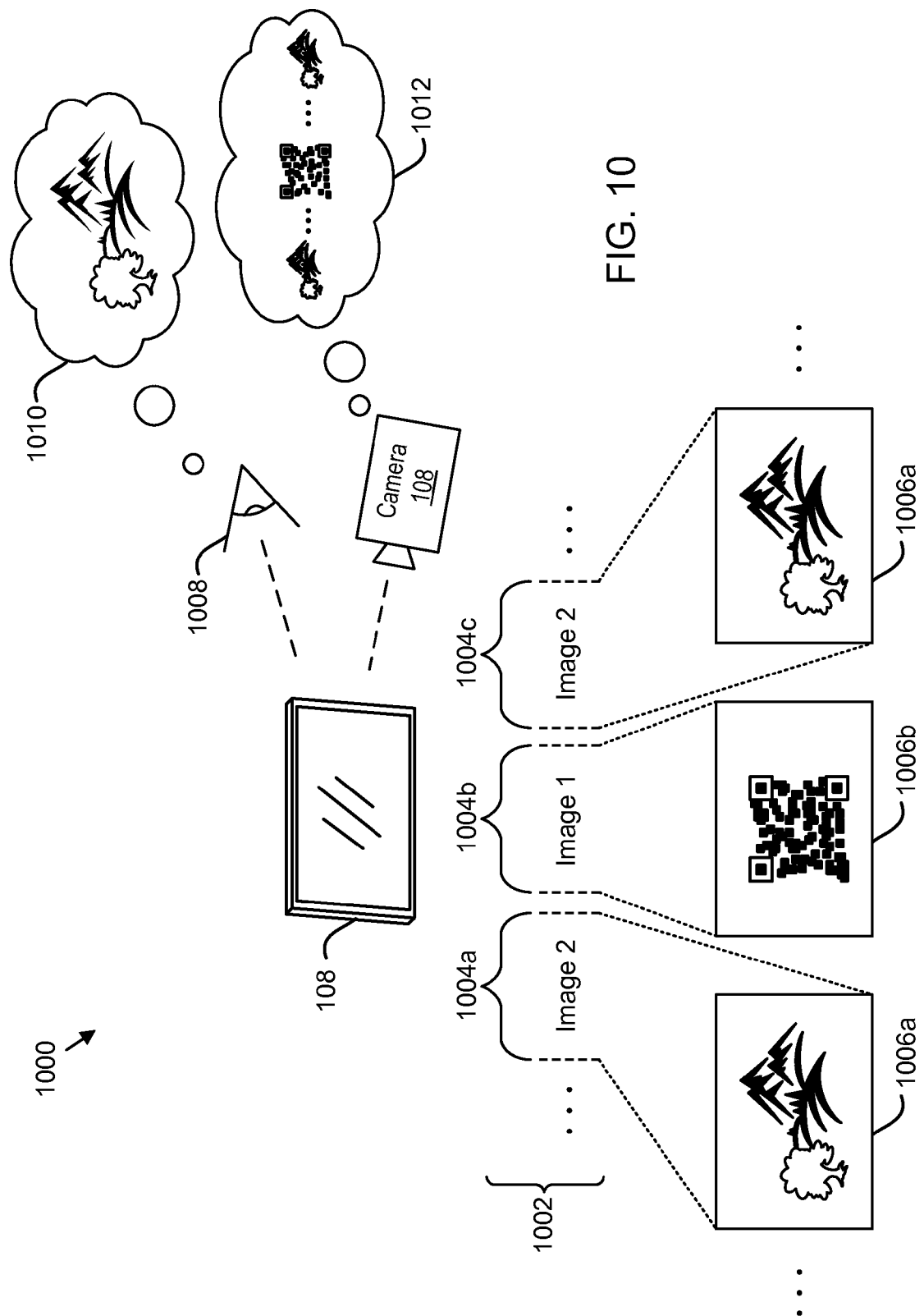
FIG. 10 is a schematic diagram illustrating one embodiment of perception of another image sequence by a human eye and a camera.

FIGS. 9 and 10 illustrate example image sequences and the appearance of the example image sequences to a human eye and a camera 108. FIG. 9 is a schematic diagram 900 illustrating perception of a display 104 by a camera 108 and an eye 908. The display 104 displays an image sequence 902. The image sequence 902 includes a hidden time slot 904*b*, during which image 1 906*b* is displayed, as well as a preceding time slot 904*a* and a subsequent time slot 904*c*, during which image 2 906*a* is displayed. Image 1 906*b* may include an advertising image or any other image or information that is to be unobtrusively presented on the display 104 such that it is not perceivable by the eye 908. Image 2 906*a* may include an image which provides a desired appearance of the image sequence 902 to a human. For example, the combination of image 1 906*b* and image 2 906*a* within the image sequence 902 may present artwork, an image which blends in with its background, or any other human perceivable display discussed herein. In one embodiment, the combination of image 1 906*b* and image 2 906*a* within the image sequence 902 may appear like a building surface or a uniform surface such that the display blends into a background. The image sequence 902 may include time slots 904*a*, 904*b*, 904*c* with any of the durations discussed herein. For example, time slot 904*b* may be equal to or less than a CFI of the eye 908. Similarly, the order in which images are displayed within the image sequence 902 may vary according to any embodiment discussed herein.

In one embodiment, the image sequence 902 is displayed while the eye 908 and the camera 108 are observing the display 104. For example, the display 104 may be in the field of view of the eye 908 and camera 108. During display of the image sequence 902, the eye 908 may perceive a composite image 910. For example, the sum of the images shown during an integration period for the eye 908 may equal the composite image 910. In some embodiments, a trace of the hidden image (e.g., image 1 906*b*) may be detectable by the eye 908 on close inspection. In some embodiments, minor modifications to image 2 906*a* may compensate for any substantial impact image 1 906*b* has on the composite image 910 as perceived by the eye 908. As used herein, the term integration period is given to mean a time period during which the eye 908 integrates optical excitation into a single image to be perceived by the eye 908 or brain. The camera 108 may have a shorter or configurable integration period or shutter speed. The shorter or configurable integration period may allow the camera 108 to separately perceive, or capture, each image in the image sequence 902. For example, the camera 108 may capture or perceive each image separately during time slots 904*a*, 904*b*, 904*c*, as illustrated in the camera perception 912.

FIG. 10 is a schematic diagram 1000 illustrating perception of a display 104 by a camera 108 and an eye 1008, similar to FIG. 9. The display 104 displays an image sequence 1002. The image sequence 1002 includes a hidden time slot 1004*b*, during which image 1 1006*b* is displayed, as well as a preceding time slot 1004*a* and a subsequent time slot 1004*c* during which image 2 1006*a* is displayed. Image 1 1006*b* includes encoded audio data or any other image or information that is to be unobtrusively presented on the display 104 such that it is not perceivable by the eye 1008. For example, image 1 1006*b* may encode audio, control information, or any other data and may also include a human perceivable image, such as the image of FIG. 7. Image 2 1006*a* may include an image which provides a desired appearance of the image sequence 1002 to a human. For example, the combination of image 1 1006*b* and image 2 1006*a* within the image sequence 1002 may present artwork, an image which blends in with its background, or any other human perceivable display discussed herein. The image sequence 1002 may include time slots 1004*a*, 1004*b*, 1004*c* with any of the durations discussed herein. For example, time slot 1004*b* may be equal to or less than a CFI of the eye 1008. Similarly, the order in which images are displayed within the image sequence 1002 may vary according to any embodiment discussed herein.

In one embodiment, the image sequence 1002 is displayed while the eye 1008 and the camera 108 are observing the display 104. For example, the display 104 may be in the field of view of the eye 1008 and/or camera 108. During display of the image sequence 1002, the eye 1008 may perceive a composite image 1010. For example, the sum of the images shown during an integration period for the eye 1008 may equal the composite image 1010. In some embodiments, a trace of the hidden image (e.g., image 1 1006*b*) may be detectable by the eye 1008 on close inspection. In some embodiments, minor modifications to image 2 1006*a* may compensate for any substantial impact image 1 1006*b* has on the composite image 1010 as perceived by the eye 1008. The camera 108 may have a shorter or configurable integration period, or shutter speed, in comparison to the eye 1008. The shorter or configurable integration period may allow the camera 108 to separately perceive, or capture, each image in the image sequence 1002. For example, the camera 108 may capture or perceive each image separately during time slots 1004*a*, 1004*b*, 1004*c*, as illustrated in the camera perception 1012.

Returning to FIG. 3, the display component 304 is configured to display at least a portion of a captured image to a human user. For example, the display component 304 may include or be in communication with a display on which the portion of the captured image can be displayed. In one embodiment, the display component 304 displays the image on a smartphone display or another display of the portable electronic device 106. For example, the display may include a display of a smartphone, personal digital assistant (PDA), tablet computer, laptop, or other device. As another example, the display may include a body-mounted display, vehicle-mounted display, or head-mounted display. In one embodiment, the display includes a heads-up display (HUD) such as a display on a transparent surface such as a vehicle HUD or head-mounted HUD. HUDs may allow for a user to see displayed information while continuing a visual task such as driving, walking, working, or the like. One example of a HUD is glasses which have a transparent display, such as Google Glass®. Another example is an in-car HUD which displays information on a windshield. In one embodiment, the display component 304 displays the image at a location, with respect to a point-of-view of a user, overlaying the display 104 from which the image was captured.

In one embodiment, the display component 304 displays the image in real time, for example when the message or image is received and/or while the source display 104 from which the information was derived is still in view. However, the display component 304 may display the image for a greater duration to render the image perceivable by the user. For example, instead of displaying an image for less than a CFI, the display component 304 may display the image for much longer than the CFI so that a user can get a good look. In one embodiment, the image may be stored for later display or presentation to the user. For example, the image or other data related to a message may be stored and saved or sent to a user for review of the message at a later or convenient time.

The image or images displayed by the display component 304 to the user may include images including or based on an image captured by the capture component 302. For example, a displayed image may include at least a portion of the actual captured image. In one embodiment, the captured image may be processed to improve appearance to the user. The displayed image may include pictures, symbols, text, video, or other data that was visually presented on the display 104 and captured by the capture component 302.

In one embodiment, the display component 304 may display the portion of the captured image in accordance with one or more display or capture instructions. For example, only a specific portion of the captured image may be displayed, or the image may be shown with one or more other captured images to provide a complete message. In one embodiment, the display component 304 may display the images to accompany rendered audio data or other audio.

The audio component 306 is configured to render audio based on audio data encoded in a captured image. For example, if the capture component 302 captures an image that includes encoded audio data, the audio component 306 may play the audio data for a user. Example images which may encode audio data include the images of FIGS. 7 and 8, as discussed previously. In one embodiment, the audio component 306 times a rendering of the audio based on synchronization instructions received by the portable electronic device 106 from a display 104, message delivery system 102, content provider system 112, server 114, or other device. For example, the audio component 306 may time rendering of the audio data to match a composite image displayed by a display 104, or an image or video displayed by the display component 304 of the portable electronic device 106. For example, the audio data may be played to match display of a captured image that includes human readable information, images, or symbols. In one embodiment, the audio data may be played in real time as the audio data is received or to accompany a visual display on the display 104. In one embodiment, the audio component 306 plays the audio data using an audio output interface. For example, the audio component 306 may play the audio data on a speaker connected to the audio output interface. The speaker or audio output interface may be integrated or connected to a smartphone, tablet computer, laptop, in-vehicle audio system, or the like. In one embodiment, the audio data is played on headphones.

The instruction component 308 obtains instructions for control of a portable electronic device 106. For example, the control instructions may include an indication of the presence of unobtrusive messages, subject matter indications, capture instructions, synchronization instructions, or any other information that affects capture and/or display of messages at the portable electronic device 106. For example, the instruction component 308 may obtain any of the information discussed herein in relation to the notification component 206 of the message delivery system 102.

In one embodiment, the instruction component 308 obtains or detects tags or indications that an unobtrusive message is present within an image sequence. For example, the instruction component 308 may detect a tag indicating a presence of a first image set that includes one or more images corresponding to a message for potential presentation to a user. Similarly, the instruction component 308 may obtain a tag indicating that audio data, or any other data, is encoded within an image in the image sequence.

In one embodiment, the instruction component 308 obtains capture instructions that indicate which images correspond to a message and/or how to capture the image(s). In one embodiment, the instruction component 308 provides the capture instructions to the capture component 302 to enable capture of one or more images from a displayed image sequence. The capture instructions may include one or more of a timing, an image sequence, and/or a frame number for an image corresponding to an unobtrusive message. For example, the capture instructions may indicate which images are related to a specific message and indicate a timing for the capture component 302 to capture the images. Timing information may indicate the start and stop times for the capture of individual images, may indicate the intervals between images, may indicate the intervals between the end of displaying one image and the start of displaying the next image, etc. For example, if the image sequence includes a first image set corresponding to a message to be captured and/or displayed, as well as a second image set not for capture or display, the capture instructions may enable the capture component 302 to capture an image from the first image set without the capture overlapping with display of an image from the second image set.

In one embodiment, the instruction component 308 obtains data that indicates a subject matter for one or more images and/or corresponding messages. In one embodiment, an image sequence includes images for a plurality of different messages, and the instruction component 308 obtains data that indicates the subject matter for each separate message or image. The subject matter data may indicate whether a message (and the associated images within the image sequence) is related to advertising, a warning, a public service announcement, or a message for a specific individual or group of individuals. In one embodiment, the indication of subject matter may indicate a topic for an advertisement, a warning, or any other message. For example, the indication of subject matter may indicate whether an advertisement relates to automobiles, groceries, restaurants, sporting goods, electronics, events, or any other topic. Similarly, the indication of subject matter may indicate whether the advertisement is directed towards a specific age group, gender, profession, language, and/or other demographic. The subject matter data may indicate whether a message contains only images, only audio, only video, only text, or a combination of audio, images, video, and text.

In one embodiment, the instruction component 308 obtains decoding instructions. The decoding instructions may indicate how to decode data visually encoded into one or more images in the image sequence. For example, the decoding instructions may indicate a format, rules for decoding, a location of the encoded data within the image, or any other information regarding encoding or decoding of data encoded in a visual format within an image. In one embodiment, the decoding instructions indicate that data is encoded in a specific barcode format, in a watermark, and/or in any other format.

In one embodiment, the instruction component 308 may obtain synchronization instructions indicating a timing for rendering one or more of captured audio data and images. For example, a first image from a first image set may include an image to be displayed to a human as part of a message, and a second image from the first image set may include visually encoded audio data to accompany display of the first image as part of the message. The synchronization instructions may indicate the timing for rendering the audio to correctly present the message. In one embodiment, the synchronization instructions may indicate a timing in relation to real-time display of images on the display 104, such as a composite image, such that the audio is synchronized to the displayed images.

In one embodiment, the instruction component 308 obtains the control information or other instructions using a decoding component 310 or a network component 312. For example, one or more of the tags, audio data, capture instructions, synchronization instructions, decoding instructions, subject matter data, or other data may be encoded visually within images in a displayed image set and/or communicated via a network connection with the portable electronic device 106. In one embodiment, the instruction component 308 may obtain visually encoded information using a decoding component 310 and may receive wireless or wired network signals, or other communication signals, using a network component 312.

The decoding component 310 is configured to decode data visually encoded into an image. For example, the decoding component 310 may process an image according to one or more decoding instructions to decode one or more of the tags, audio data, capture instructions, synchronization instructions, decoding instructions, subject matter data, or other data visually encoded into the image. In one embodiment, the decoding component 310 is configured to process and decode data encoded as a linear or two-dimensional barcode. In one embodiment, the decoding component 310 is configured to process an image to decode a watermark. In one embodiment, the decoding component 310 processes each image captured by the capture component 302 to detect or decode any encoded data.

The network component 312 may include an antenna or networking card to communicate over a wired or wireless communication interface. For example, the network component 312 may include a radio or connection port to allow the portable electronic device 106 to communicate in one or more different wired or wireless communication standards. In one embodiment, the portable electronic device 106 may include a smartphone, a tablet computer, or any other communication device for use with a mobile communication network. The network component 312 may allow communication with one or more remote devices (such as a content provider system 112 or server 114) or a nearby device, such as the message delivery system 102.

In one embodiment, the network component 312 receives signals that include one or more of the tags, capture instructions, synchronization instructions, decoding instructions, subject matter data, or other data for use by any of the other components 302-310 and 314-316. In one embodiment, the network component 312 receives any of the data via one or more of a website, a wireless communication interface, a push message, a pull message, or the like.

The preference component 314 is configured to determine whether or not to capture, display, or delete an image, or information corresponding to a message, based on preferences of a user or the portable electronic device 106. For example, the preference component 314 may store one or more current settings or preferences for the portable electronic device 106 or a user of the portable electronic device 106. In one embodiment, a setting or preference may indicate that a user or device 106 currently should not receive and/or display unobtrusive messages. In one embodiment, the settings or preferences may indicate that only emergency and/or public service announcements should be obtained and/or provided to a user. In another embodiment, the settings or preferences may indicate that only messages designated for the user or a group corresponding to the user should be captured and/or provided to the user. In yet another embodiment, the settings or preferences may indicate that all messages should be captured and/or provided to the user. In one embodiment, a device 106 may be in a silent or "do not disturb" mode that blocks playing audio or displaying a message.

In one embodiment, settings or preferences stored or accessed by the preference component 314 may indicate demographic categories to which the user belongs. Settings or preferences may be associated specifically with a device 106 or with an account. The preference component 314 may determine the settings or preferences based on the account and/or information stored on the device 106. For example, the preference component 314 may determine an approximate age, gender, profession, or location of the user, or any other similar information. Similarly, the preference component 314 may determine current products or services the user is seeking. For example, a user may indicate that the user is currently searching for a new car or deals on restaurants. It will be understood by one of skill in the art that the range of preferences or settings is large and is contemplated within the scope of this disclosure.

In one embodiment, the preference component 314 may determine whether a specific message (or corresponding image) should be captured or presented to a user. In one embodiment, a message may be captured and then the preference component 314 may determine whether to provide the message to the user, store the message in memory, or delete the message based on preferences and settings. In another embodiment, messages may only be captured if they are in line with the preferences and settings of the user or device 106. In one embodiment, the preference component 314 determines whether to capture or provide a specific message to a user by comparing the subject matter or subject data of the message to the preferences or settings. If the subject matter matches or fits within the preferences and settings, the preference component 314 may indicate to the capture component 302, display component 304, audio component 306, and/or other component to provide the message to the user.

The processor 316 may include a general-purpose or optimized processor for controlling operation of the portable electronic device 106. In one embodiment, the components 302-314 may include computer readable medium and/or instructions executable by the processor 316. In one embodiment, the components 302-314 may include circuitry in communication with and/or under control of the processor 316.

Figure 11A:
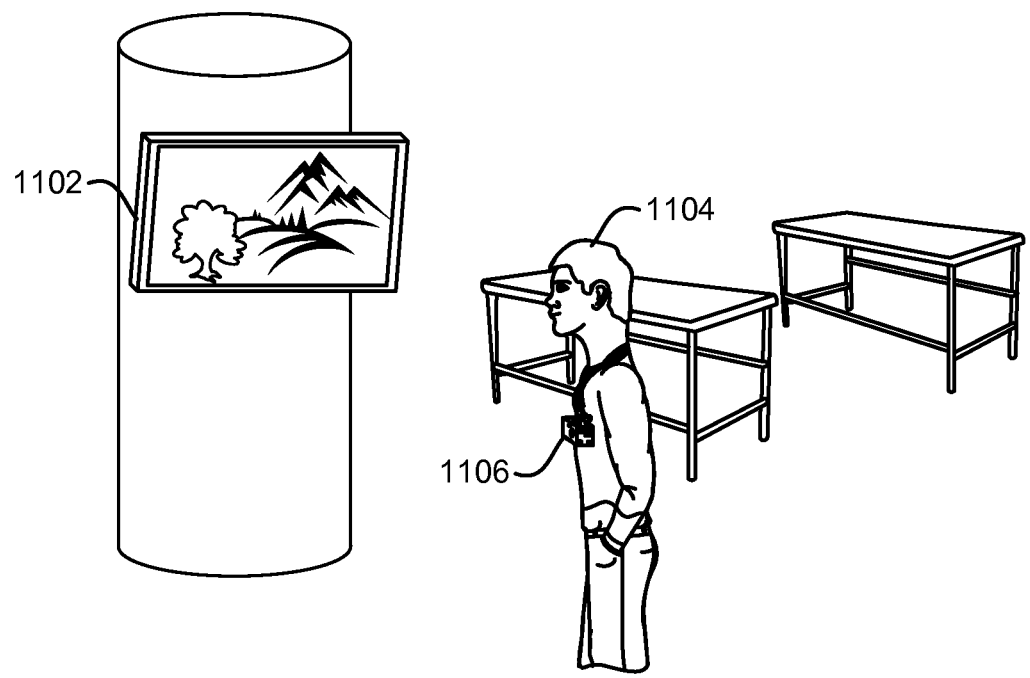
FIGS. 11A and 11B illustrate one embodiment of displaying an image sequence in a public location.

Turning to FIGS. 11A through 14, example display and presentation of unobtrusive messages will be discussed. FIGS. 11A and 11B illustrate one embodiment of a display 1102 displaying an unobtrusive visual advertisement in a public location. In the illustrated embodiment, the display 1102 displays the image sequence 902 of FIG. 9. An individual 1104 wearing a portable electronic device 1106 is shown walking near the display 1102. The display 1102 may be located in a library or airport, or another location, where some individuals may not wish to be bothered by advertisements or messages. In FIG. 11A a composite image, as the image sequence appears to the individual 1104, is illustrated. The individual 1104 may walk by the display 1102 and only perceive a display of art or some other image. In one embodiment, the composite image may have an appearance to blend into a background. For example, if the display 1102 is located on a brick wall, the display 1102 may have a composite image that matches the brick wall.

Figure 11B:
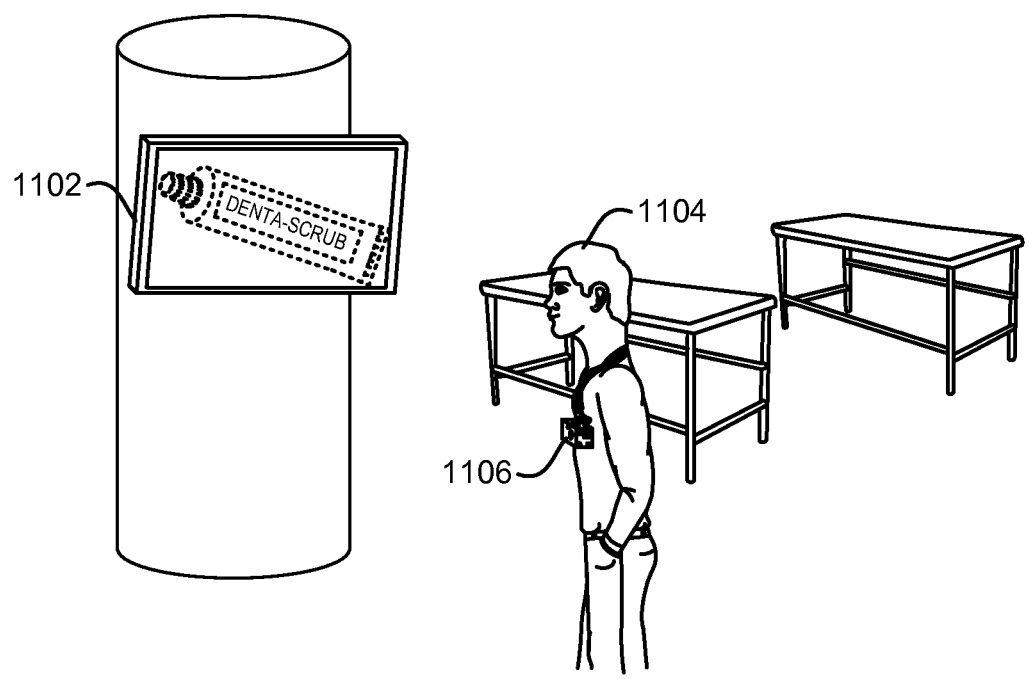

In FIG. 11B, an image corresponding to a message is shown in the display 1102. For example, the image shown in FIG. 11B may be a "hidden" or unobtrusive image that can only be perceived with the aid of a computing device such as the wearable portable electronic device 1106. In one embodiment, the wearable portable electronic device 1106 captures the image corresponding to the message and stores it for later presentation to the individual 1104. For example, the wearable portable electronic device 1106 may capture or keep the image if the image corresponds to a message that falls within the settings or preferences of the individual 1104 and/or wearable portable electronic device 1106. In one embodiment, the wearable portable electronic device 1106 may turn on an indicator light or play an audio notification indicating to the individual 1104 that a message has been received or captured. The individual 1104 may then be able to review the message when convenient.

Figure 12:
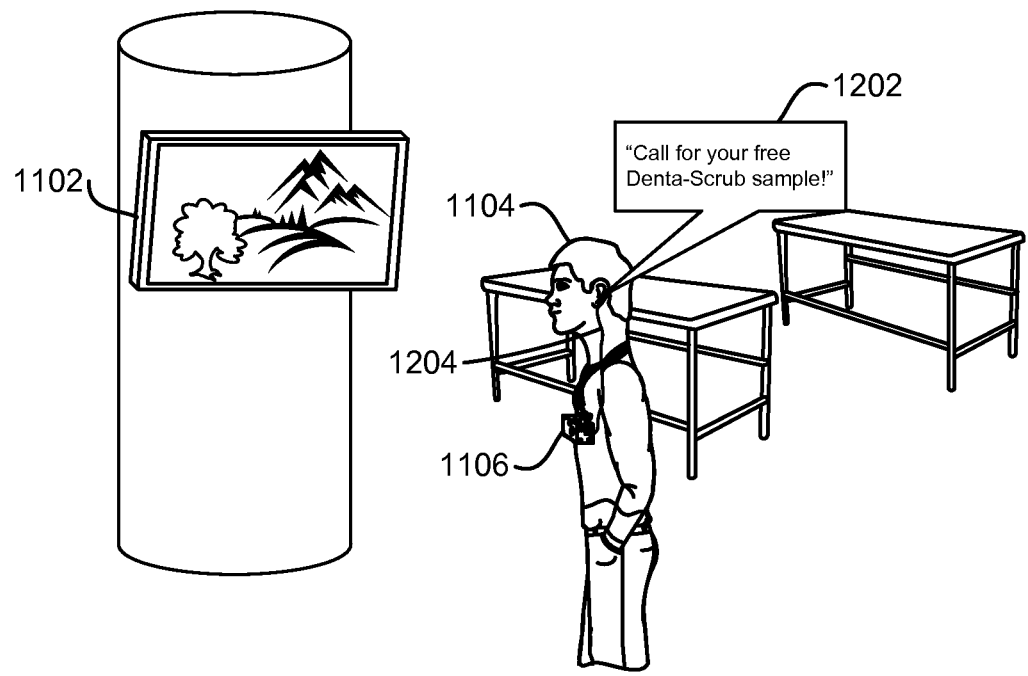
FIG. 12 illustrates one embodiment of displaying an image sequence encoding audio in a public location.

FIG. 12 illustrates one embodiment of a display 1102 providing an unobtrusive audio advertisement in a public location. The display 1102 displays an image sequence (such as the image sequence 1002 of FIG. 10) that includes a "hidden" image which encodes audio data. For example, the hidden image may include machine readable information encoding the audio data. During display of the image sequence, the display 1102 appears to be showing a human perceivable composite image in which the hidden image is not perceivable or is very faint. The wearable portable electronic device 1106 captures the hidden image, decodes the encoded audio data, and renders the audio data as part of an audio message 1202 on headphones 1204 for perception by the individual 1104. Thus, the individual 1104 may receive the audio message 1202 while others within the vicinity are not bothered by an unwanted audio message. In one embodiment, the wearable portable electronic device 1106 plays the audio message 1202 in real time, such that the individual 1104 receives the message 1202 shortly after the wearable portable electronic device 1106 captures the image comprising the audio data. In another embodiment, the wearable portable electronic device 1106 may store the audio data for later presentation to the individual 1104.

Figure 13:
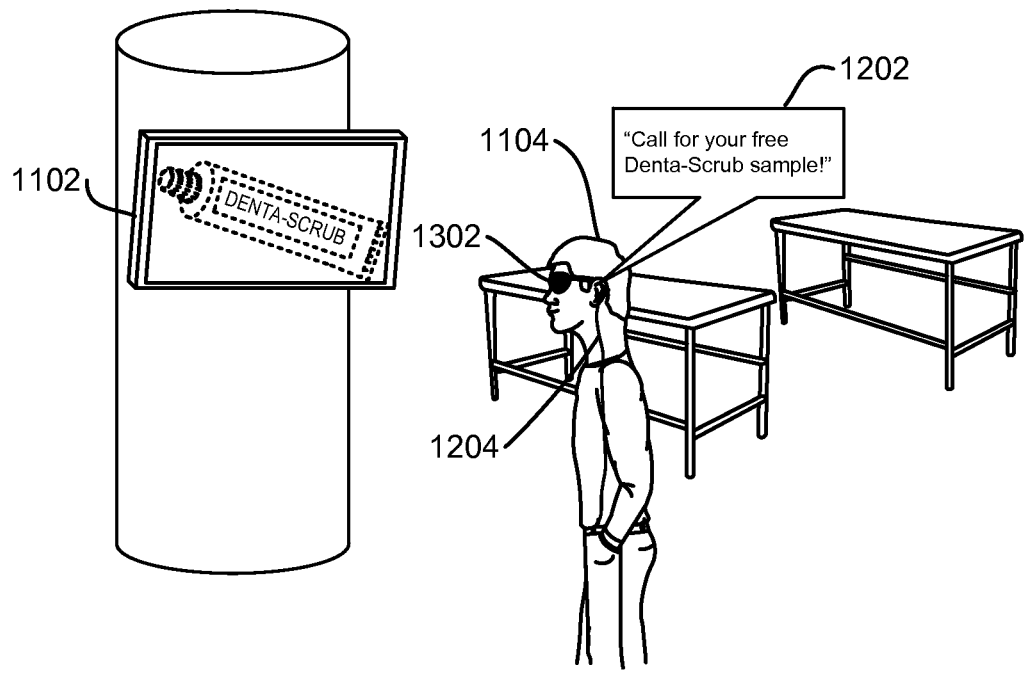
FIG. 13 illustrates another embodiment of displaying an image sequence encoding audio in a public location.

FIG. 13 illustrates one embodiment of a display 1102 providing an unobtrusive audiovisual advertisement in a public location. The individual 1104 is wearing glasses 1302 which provide a HUD. The glasses 1302 may embody a portable electronic device (such as the portable electronic device 106 of FIG. 3) or may be in communication with a portable electronic device. As the individual 1104 walks by and looks at the display 1102, the display 1102 displays an image sequence that includes one or more "hidden" images which include human readable images and encoded audio data. For example, a single hidden image may include machine readable information encoding the audio data and a human readable image, or a first image may include encoded audio data while a second image includes a corresponding human readable image.

During display of the image sequence, the display 1102 appears, to the unaided human eye, to be showing a human perceivable composite image in which the hidden image is not perceivable or is very faint. The portable electronic device (not shown), such as a smartphone, tablet, or other portable computing device, captures the hidden image(s) and decodes the encoded audio data. If in accordance with the preferences of the individual 1104, the portable electronic device presents the message to the individual 1104. For example, the glasses 1302 may display the human readable image on a HUD, and the headphones 1204 may render the audio data as part of the audio message 1202. Thus, the individual 1104 may receive the audiovisual message while others within the vicinity are not bothered by an unwanted audiovisual message. In one embodiment, the portable electronic device plays the audiovisual message in real time, such that the individual 1104 sees and hears the message while the display 1102 is still in view. In one embodiment, the glasses 1302 render the image corresponding to the message in the location of the display 1102 such that the display 1102 appears, to the individual 1104, to be displaying the image corresponding to the message. In another embodiment, the portable electronic device may store the audiovisual message for later presentation to the individual 1104. Example locations for unobtrusive messages may include libraries, stores, transport centers, restaurants, store windows, streets, bus stops, billboards, or any other location where an electronic display may be located.

Figure 14:
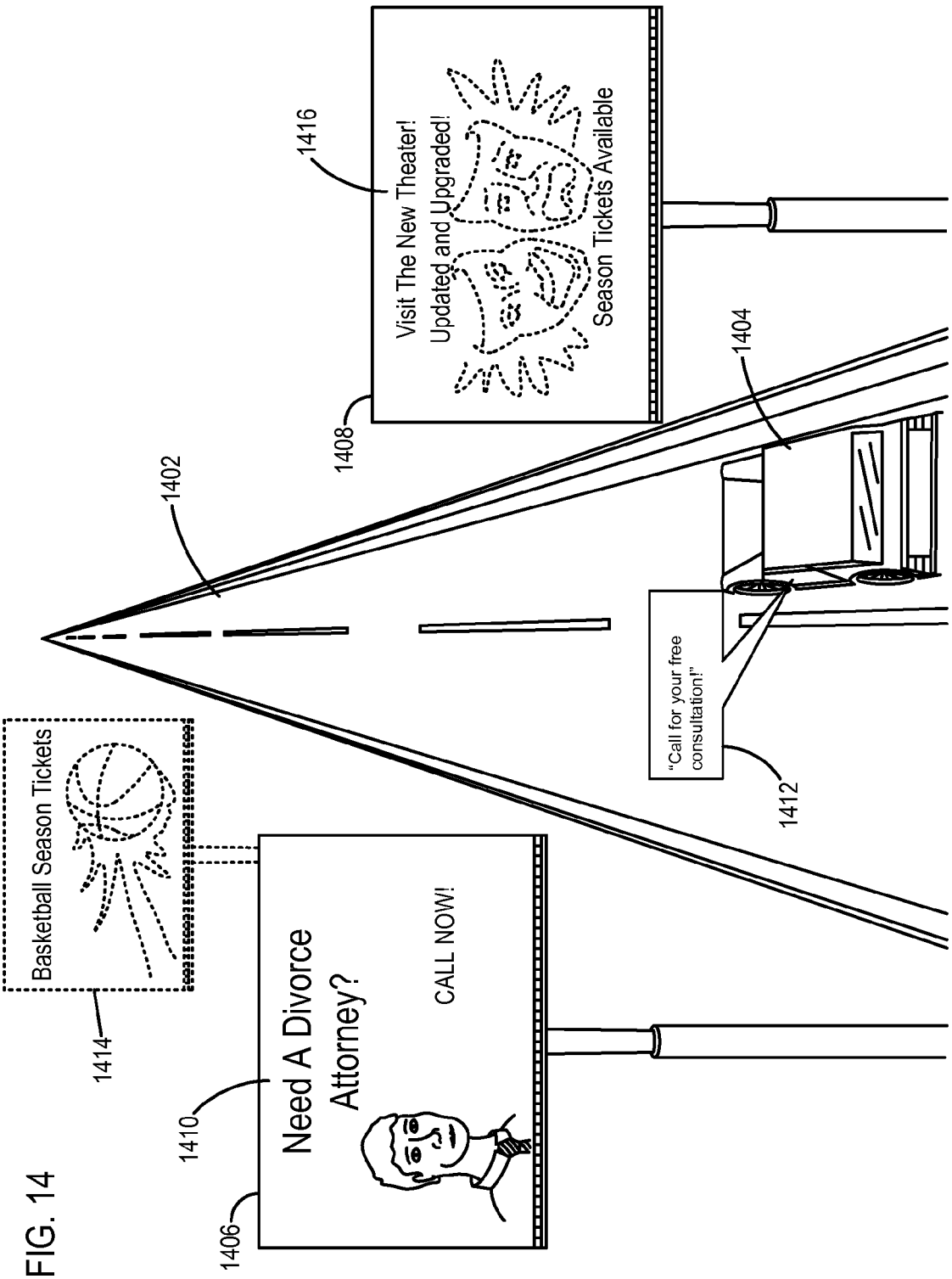
FIG. 14 illustrates one embodiment of displaying an image sequence near a roadway.

FIG. 14 illustrates display of unobtrusive messages near a roadway 1402. A vehicle 1404 is driving on the roadway 1402. The vehicle 1404 includes, or is in communication with, a portable electronic device. For example, a driver's cell phone may include one or more of the components illustrated and discussed in relation to FIG. 3. The vehicle 1404 may include a HUD and an audio system in communication with the portable electronic device. The portable electronic device may be configured to capture images and other message data from electronic signs, as discussed herein. A first electronic billboard 1406 and a second electronic billboard 1408 are shown near the roadway 1402 and in view of passing vehicles.

The first electronic billboard 1406 displays an image sequence that includes data for a plurality of messages. For example, the image sequence may be similar to the image sequence of any of FIG. 4, 5, 6, 9, or 10. The image sequence creates a composite image 1410 that is perceivable to a user without machine assistance. For example, the composite image 1410 may appear as an advertising message for a divorce attorney, as illustrated. According to one embodiment, one or more images of the image sequence encode audio data and are not perceivable. The audio data corresponds to an audio track for the composite image 1410. The portable electronic device captures images from the image sequence on the first electronic billboard 1406, decodes audio data and any other information related to the message, and plays audio 1412 corresponding to the audio data in the vehicle 1404. In one embodiment, the portable electronic device may also include synchronization instructions indicating at what point the audio 1412 should be played. For example, the synchronization instructions may indicate that the audio 1412 should be played while the first electronic billboard 1406 is still within view of the vehicle 1404 or the portable electronic device.

The image sequence displayed by the first electronic billboard 1406 may also include one or more additional images corresponding to an additional message. The additional message may be related to basketball season tickets. In one embodiment, the portable electronic device of the vehicle 1404 captures the additional message and displays a virtual billboard 1414. The location for display of the virtual billboard 1414 may be determined by the portable electronic device or may be received in control instructions using an instruction component 308. The virtual billboard 1414 may not really be located as displayed, but may be displayed as if it were there, as in augmented reality. The virtual billboard 1414 is shown with dotted lines to indicate that it is not really there. The virtual billboard 1414 (as displayed by a display component 304) may display an image captured by the portable electronic device. In one embodiment, an individual within the vehicle 1404 may be able to see two different messages based on information displayed on one electronic billboard. Audio data may also be played within the vehicle 1404 in relation to the virtual billboard 1414.

The second electronic billboard 1408 may likewise display an image sequence corresponding to a plurality of messages. In one embodiment, the portable electronic device of the vehicle 1404 may receive subject matter data indicating subject matter for the different messages. A preference component 314 may determine which message best matches a driver's preferences or settings and select that message to be presented. A capture component 302 captures corresponding images, a decoding component 310 decodes audio or other control instructions, and a display component 304 displays a captured image 1416. In one embodiment, the display component 304 displays the captured image 1416 at a location overlaying the second electronic billboard 1408. The captured image 1416 is illustrated with dotted lines indicating that it is visible to the driver of the vehicle 1404 due to the display component 304, and would otherwise not be visible to the driver.

Figure 15:
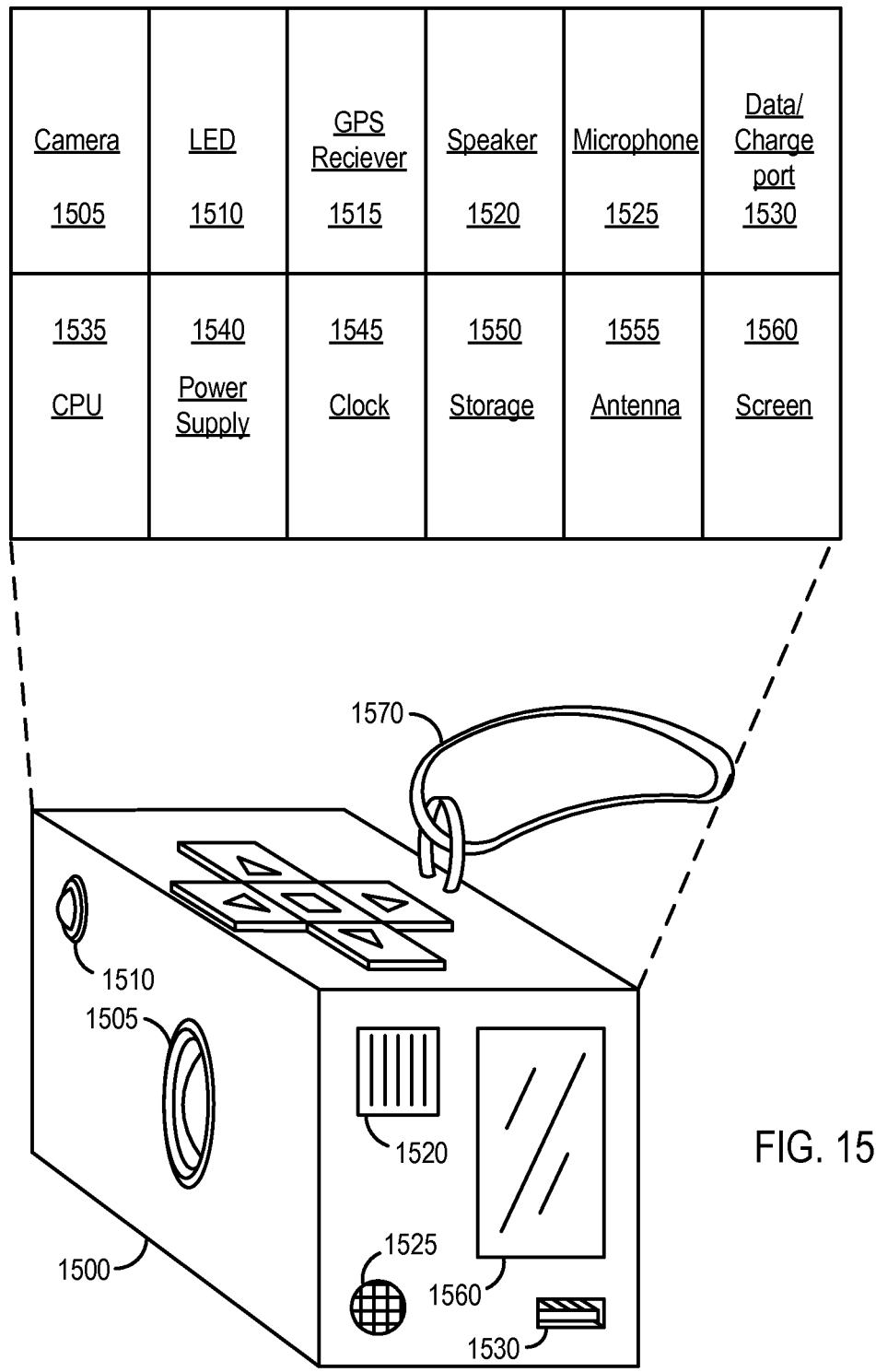
FIG. 15 illustrates one embodiment of a wearable portable electronic device.
Figure 16:
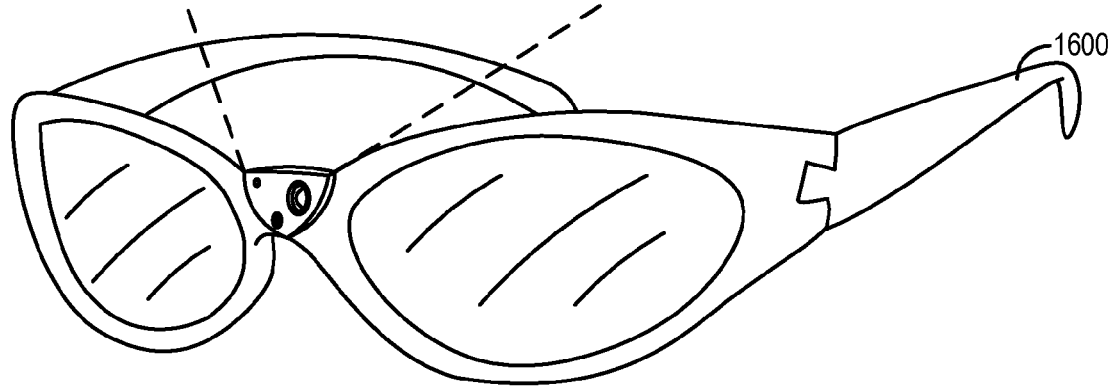
FIG. 16 illustrates another embodiment of a wearable portable electronic device.

FIGS. 15 and 16 illustrate portable electronic devices according to example embodiments. FIG. 15 illustrates a wearable portable electronic device 1500 in a perspective view and block diagram view. The wearable portable electronic device 1500 includes a camera 1505, a light emitting diode (LED) 1510, a global positioning system (GPS) receiver 1515, a speaker 1520, a microphone 1525, a data/charge port 1530, a central processing unit (CPU) 1535, a power supply 1540, a clock 1545, storage 1550, an antenna 1555, a display screen 1560, and an attachment lanyard 1570.

The camera 1505 may be used to capture images. The LED 1510 may be used to indicate a status of the wearable portable electronic device 1500 or that a message has been obtained. The GPS receiver 1515 may be used to determine a location of the wearable portable electronic device 1500 and identify nearby displays to facilitate downloading control instructions. The speaker 1520 may be used to render captured audio data or play alert sounds or messages. The microphone 1525 may be used to receive voice commands or record sounds. The data/charge port 1530 may be used to charge the wearable portable electronic device 1500, update software, or download message data from the wearable portable electronic device 1500. The CPU 1535 may be used to control the wearable portable electronic device 1500. The power supply 1540 may include a battery for powering the wearable portable electronic device 1500. The clock 1545 may be used to determine a time and/or synchronize the wearable portable electronic device 1500 with a display. The storage 1550 may be used to store messages. The storage 1550 may additionally or alternatively be used to store instructions corresponding to one or more of the components 302-314 of FIG. 3. The antenna 1555 may be used for wireless communication with a network 110 or with a message delivery system 102. The screen 1560 may be used to display information such as captured images or a control interface for the wearable portable electronic device 1500.

FIG. 16 illustrates a head-mounted wearable portable electronic device 1600, according to one embodiment. In one embodiment, the wearable portable electronic device 1600 includes the same components 1505-1560 illustrated and discussed in relation to FIG. 15. According to one embodiment, the wearable portable electronic devices 1500 and 1600 may include fewer components and be in communication with a separate portable electronic device such as a smartphone or tablet computer which includes one or more of the components 302-316 of FIG. 3.

FIG. 17 illustrates one embodiment of a method 1700 for providing an unobtrusive audio message. The method 1700 may be performed by a message delivery system, such as the message delivery system 102 of FIG. 2. The method 1700 may allow for the display of images with encoded audio without distracting individuals and/or may allow for an increase in the number of audio or visual messages delivered by a single display/device.

The method 1700 begins and a receive component 202 receives 1702 a first image set and a second image set. The first and second image sets may be received 1702 from memory or may be received from another device, such as a remote server. The first image set may include one or more images that correspond to a message for delivery using the message delivery system 102. The first image set may include one or more images which include audio data in machine readable form. For example, the audio data may be visually encoded audio data for rendering on an electronic computing device. In one embodiment, the receive component 202 receives 1702 the first image set with audio already encoded within the first image set. In one embodiment, audio is encoded in the first image set by the message delivery system 102. The first image set may include a plurality of images corresponding to one message, such as an audio track of a message. The second image set may include images for creating a composite image when displayed with one or more images from the first image set. In one embodiment, the second image set includes images corresponding to one or more additional audio or visual messages.

A display sequence component 204 displays 1704 images from the first and second image sets interspersed in an image sequence. In the image sequence, a time interval between each image from the first image set and at least one image from the second image set is less than the CFI for a human eye. In the image sequence, each image from the first image set may be interspersed between a previous image selected from the second image set and a subsequent image selected from the second image set. For example, the images immediately preceding and following each image from the first image set may include images corresponding to a different message or an otherwise substantially different image. A duration between the previous image and the subsequent image is less than a CFI for a human eye. The display 1704 of the image sequence may obscure or hide the image from the first image set even though the image from the first image set is being displayed. For example, the short duration, in combination with other images being shown before and after, may cause the image from the first image set to be imperceptible or indistinguishable to an unaided human eye. In one embodiment, the display sequence component 204 may also determine the image sequence or make modifications to one or more images within the image sequence to more effectively obscure an image from the first image set.

Optionally, a notification component 206 provides 1706 control information to an electronic computing device. For example, the control information may include tags, capture instructions, synchronization instructions, decoding instructions, subject matter data for messages, or any other data for informing an electronic computing device how to capture, decode, and/or display a message. In one embodiment, the notification component 206 may provide 1706 the control information using a network component 208 to send data over a network or communication port. In one embodiment, the notification component 206 may provide 1706 the control information by using an encoding component 210 to encode data into one or more images of the image sequence.

The method 1700 discussed above is given by way of example only. Any of the processes, functionality, or methods discussed herein may also be included within the method 1700 in varying embodiments.

FIG. 18 illustrates one embodiment of a method 1800 for capturing and providing a message from an image sequence that includes an unobtrusive audio message. The method 1800 may be performed by a portable electronic device, such as the portable electronic device 106 of FIG. 3. The method 1800 may allow for presentation of a message to a user of the portable electronic device without distracting nearby individuals and/or may allow for an increase in the number of messages delivered using a single display.

The method 1800 begins and a capture component 302 captures 1802 an image from a first image set within an image sequence displayed on a display. For example, the image sequence may be displayed on a display 104 controlled by a message delivery system 102. The image may include audio data for rendering on an electronic computing device. For example, the image may include audio data encoded in a visual format within one or more images. The audio data may be machine readable and may be in a barcode, watermark, or other visual encoding format. The image sequence may display the image between a previous image and a subsequent image within a duration less than a CFI for a human eye. Due to the image sequence, the image from the first image set may not be perceivable to individuals without the aid of a portable electronic device. In one embodiment, the capture component 302 captures 1802 the captured image during a time period that does not overlap with display of other images in the image sequence. For example, light from the previous or subsequent images may not be captured.

In one embodiment, the capture component 302 captures 1802 the image based on capture instructions received from a message delivery system 102 or from a remote device over a network 110. The capture instructions may indicate one or more of a timing, a sequence number, a frame number, or other information regarding images in the image sequence to enable the capture component 302 to capture 1802 the image from the first image sequence. In one embodiment, the capture component 302 captures 1802 only images that correspond to messages that align with preferences of a user or settings of a portable electronic device.

An audio component 306 renders 1804 audio for an individual. For example, the audio component 306 may render 1804 an audio message or track that includes the audio data from the captured image on a speaker of the electronic computing device. The audio component 306 may render 1804 the audio data by playing the audio data for the user as part of a message. The audio component 306 may render 1804 audio data from a plurality of images as part of the audio track for the message. In one embodiment, the audio component 306 may render 1804 the audio data to be timed with display of a composite image formed by the image sequence from which the audio data was obtained. In one embodiment, the audio component 306 may render 1804 the audio data to be synchronized with display of information by the electronic computing device.

The method 1800 discussed above is given by way of example only. Any of the processes, functionality, or methods discussed herein may also be included within the method 1800 in varying embodiments.

This disclosure has been made with reference to various example embodiments including the best mode. However, those skilled in the art will recognize that changes and modifications may be made to the embodiments without departing from the scope of the present disclosure. For example, various operational steps, as well as components for carrying out operational steps, may be implemented in alternate ways depending upon the particular application or in consideration of any number of cost functions associated with the operation of the system; e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create a means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
   receiving a first image set and a second image set, the first image set comprising visually encoded audio data for rendering audio on an electronic computing device; and
   displaying images from the first and second image sets interspersed in an image sequence,
   wherein each image from the first image set is displayed for a specified time display interval that does not overlap with time display intervals for images from the second image set, and
   wherein a time interval between each image from the first image set and at least one image from the second image set is less than a critical flicker interval (CFI) for a human eye.

2. The method of claim 1, wherein the time interval between each image from the second image set and at least one image from the first image set is less than the CFI.

3. The method of claim 1, wherein the specified time display interval for each image from the first image set does not overlap with the specified time display interval for any other image from the first image set.

4. The method of claim 1, wherein the time interval between an end of the specified time display interval for each image from the first data set and a start of the specified time display interval for at least one image from the second image set is less than the CFI.

5. The method of claim 1, wherein the time interval between a start of the specified time display interval for each image from the first data set and an end of the specified time display interval for at least one image from the second image set is less than the CFI.

6. The method of claim 1, wherein the audio data corresponds to audio to accompany display of one or more images in the image sequence.

7. The method of claim 1, wherein the first image set comprises audio data encoded as a machine readable barcode.

8. The method of claim 1, wherein the first image set comprises audio data encoded by one or more of color values and intensity values of selected pixels in one or more images from the first image set.

9. The method of claim 1, further comprising visually encoding the audio data in the first image set.

10. The method of claim 1, further comprising providing synchronization instructions to the electronic computing device, wherein the synchronization instructions indicate a timing for rendering the audio in relation to one or more images of the image sequence.

11. A system comprising:
a receive component configured to receive a first image set and a second image set, the first image set comprising visually encoded audio data for rendering audio by an electronic computing device; and
a display component configured to display images from the first and second image sets interspersed in an image sequence,
wherein each image from the first image set is displayed for a specified time display interval that does not overlap with time display intervals for images from the second image set, and
wherein a time interval between each image from the first image set and at least one image from the second image set is less than a critical flicker interval (CFI) for a human eye.

12. The system of claim 11, wherein the audio data comprises at least a portion of an audio track corresponding to a message.

13. The system of claim 12, wherein the message comprises one of an audio-only message, an audio-visual message, and an audio-video message.

14. The system of claim 11, wherein at least two images in the image sequence encode audio data relating to different audio tracks.

15. The system of claim 14, further comprising an encoder component configured to tag the at least two images as corresponding to the different audio tracks.

16. The system of claim 11, further comprising a notification component configured to provide control information to the electronic computing device.

17. The system of claim 16, wherein the control information comprises synchronization instructions, wherein the synchronization instructions indicate a timing for rendering the audio in relation to one or more images of the image sequence.

18. The system of claim 16, wherein the control information comprises decoding instructions that indicate to the electronic computing device how to decode the audio data from the first image set.

* * * * *